(12) United States Patent
Ichikawa

(10) Patent No.: US 8,436,733 B2
(45) Date of Patent: May 7, 2013

(54) APPARATUS FOR COMMUNICATING WITH RFID TAG

(75) Inventor: Yasuhisa Ichikawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1175 days.

(21) Appl. No.: 11/670,984

(22) Filed: Feb. 4, 2007

(65) Prior Publication Data

US 2007/0145134 A1    Jun. 28, 2007

Related U.S. Application Data

(63) Continuation-in-part of application No. PCT/JP2005/014622, filed on Aug. 10, 2005.

(30) Foreign Application Priority Data

Aug. 12, 2004   (JP) .................................. 2004-235053

(51) Int. Cl.
*G08B 13/14* (2006.01)

(52) U.S. Cl.
USPC ....................................... 340/572.8; 340/10.1

(58) Field of Classification Search .................... 156/64, 156/249, 361, 379, 542; 400/611, 61, 70, 400/79, 613, 76; 235/487, 451, 375; 340/572.1, 340/10.1
See application file for complete search history.

(56) References Cited

U.S. PATENT DOCUMENTS

| | | | |
|---|---|---|---|
| 5,521,590 A | | 5/1996 | Hanaoka et al. |
| 5,867,102 A | * | 2/1999 | Souder et al. .............. 340/572.8 |
| 5,897,741 A | * | 4/1999 | Mills et al. ..................... 156/541 |
| 6,123,796 A | * | 9/2000 | Kathmann et al. ............. 156/249 |
| 6,280,544 B1 | * | 8/2001 | Fox et al. ......................... 156/64 |
| 6,327,972 B2 | * | 12/2001 | Heredia et al. ................... 101/35 |
| 6,645,327 B2 | * | 11/2003 | Austin et al. .................... 156/64 |
| 6,710,891 B1 | * | 3/2004 | Vraa et al. ................... 358/1.12 |

(Continued)

FOREIGN PATENT DOCUMENTS

| JP | H08-044832 A | 2/1996 |
|---|---|---|
| JP | H10-236041 A | 9/1998 |

(Continued)

OTHER PUBLICATIONS

International Bureau of WIPO, International Search Report mailed Sep. 20, 2005 for Related Application No. PCT/JP2005/014622.

(Continued)

*Primary Examiner* — Jennifer Mehmood
*Assistant Examiner* — Rufus Point
(74) *Attorney, Agent, or Firm* — Baker Botts L.L.P.

(57) ABSTRACT

The apparatus for communicating with a RFID tag includes: a signal processing circuit and a radio frequency circuit transmission unit configured to create RFID tag information which is to be written to an IC circuit part of each RFID circuit element To that transmits/receives information, the RFID circuit element To includes the IC circuit part configured to updatably store information and a tag antenna connected to said IC circuit part; and a device antenna configured to transmit RFID tag information to the tag antenna by radio communication and write the RFID tag information to the IC circuit part, disposed so as to provide at least a area X where communication can be made near the feeding-out portion of a first roll formed by a base tape including a plurality of RFID circuit elements To.

14 Claims, 21 Drawing Sheets

U.S. PATENT DOCUMENTS

| | | | |
|---|---|---|---|
| 6,899,476 B1 * | 5/2005 | Barrus et al. | 400/76 |
| 6,943,688 B2 * | 9/2005 | Chung et al. | 340/572.7 |
| 6,969,134 B2 * | 11/2005 | Hohberger et al. | 347/2 |
| 7,077,489 B2 * | 7/2006 | Waters | 347/2 |
| 7,261,479 B2 * | 8/2007 | Barrus et al. | 400/76 |
| 7,273,165 B2 * | 9/2007 | Satake et al. | 235/375 |
| 7,361,251 B2 * | 4/2008 | Green et al. | 156/264 |
| 7,425,887 B2 * | 9/2008 | Tsirline et al. | 340/10.1 |
| 7,436,302 B2 * | 10/2008 | Jessup | 340/572.1 |
| 7,439,858 B2 * | 10/2008 | Feltz et al. | 340/572.1 |
| 7,475,819 B2 * | 1/2009 | Moriyama et al. | 235/451 |
| 7,475,956 B2 * | 1/2009 | Waters | 347/2 |
| 2002/0062898 A1 * | 5/2002 | Austin et al. | 156/64 |
| 2003/0189490 A1 * | 10/2003 | Hogerton et al. | 340/572.8 |
| 2004/0141790 A1 * | 7/2004 | Waters | 400/611 |
| 2005/0110674 A1 * | 5/2005 | Mendolia et al. | 342/81 |
| 2007/0145134 A1 * | 6/2007 | Ichikawa | 235/449 |

FOREIGN PATENT DOCUMENTS

| | | |
|---|---|---|
| JP | H11-085923 A | 3/1999 |
| JP | 2001-257222 A | 9/2001 |
| JP | 2001-331768 A | 11/2001 |
| JP | 2002-329174 A | 11/2002 |
| JP | 2003-208573 A | 7/2003 |
| JP | 2004-082348 A | 3/2004 |
| JP | 2004-082432 A | 3/2004 |
| JP | 2004-118625 A | 4/2004 |
| JP | 2004-122665 A | 4/2004 |
| JP | 2002008067 A | 2/2007 |
| WO | 93/11509 A1 | 6/1993 |
| WO | 01/61646 A1 | 8/2001 |

OTHER PUBLICATIONS

Japan Patent Office, Notice of Reasons for Rejection in counterpart Patent Application No. JP 2006-531671, mailed Jan. 17, 2011.

* cited by examiner

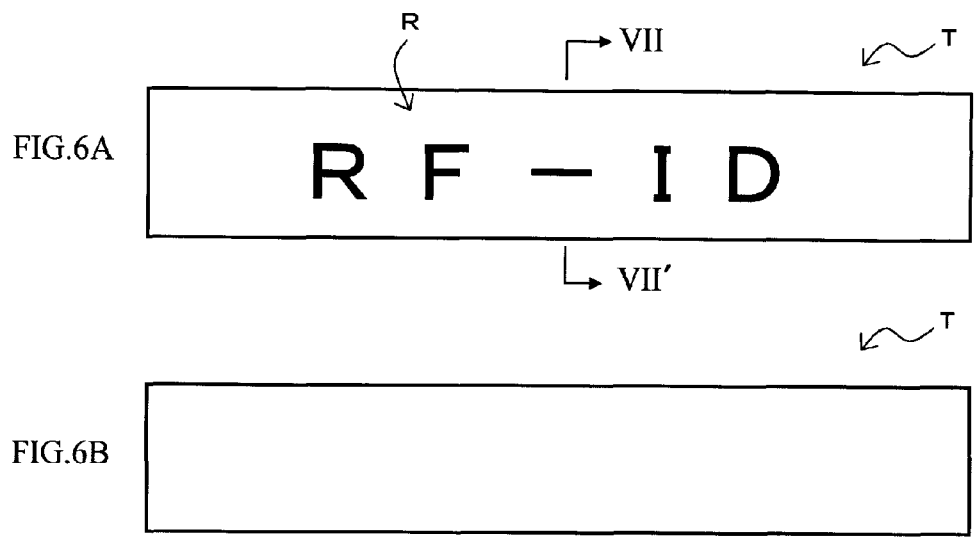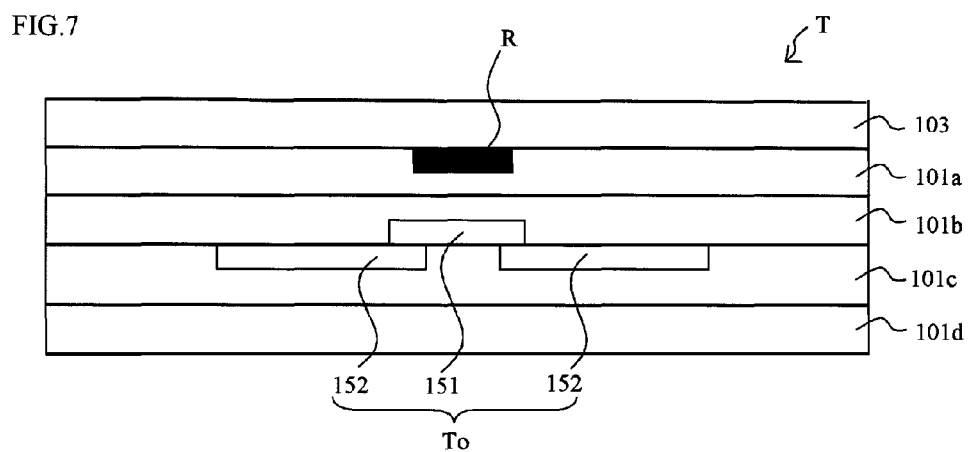

APPARATUS FOR COMMUNICATING WITH RFID TAG

CROSS-REFERENCE TO RELATED APPLICATION

This is a CIP application PCT/JP2005/014622, filed Aug. 10, 2005, which was not published under PCT article 21(2) in English and claims the benefits of Japanese Patent application No. 2004-235053 filed Aug. 12, 2004.

BACKGROUND OF THE INVENTION

1. Field of the Invention

The present invention relates to an apparatus configured to write RFID tag information to a RFID tag capable of wireless communication from/to the outside.

2. Description of the Related Art

A RFID (Radio Frequency Identification) system having a reader/writer (reading/writing apparatus) which read/write information from/to a small-size RFID tag in a non-contact manner is known. For example, a RFID circuit element provided to a label-shaped RFID tag includes an IC circuit part for storing predetermined RFID tag information and an antenna configured to transmit/receive information, connected to the IC circuit part. With such an arrangement, the reader/writer can access (read/write) the RFID tag information even if the RFID tag has become dirty, or even if the RFID tag has come to be located at a position where it cannot be seen. Thus, it is anticipated that such a technique will be of practical use in various fields such as inventory control and manufacturing process inspection.

A known example of a writer (writing apparatus) configured to write information to the above-described RFID circuit element is disclosed in Patent Publication 1. In the reference, rectangular label chips are adhered onto a strip of tag tape (continuous label sheet) at a predetermined pitch and the strip of the tag tape is fed out from a tag tape roll (roll unit). At the time of the feeding, predetermined RFID tag information created by the writing apparatus is transmitted toward an antenna of the RFID circuit element (RFID tag) contained within each label chip, and therefore the RFID tag information is serially written to each IC circuit part (IC chip) connected to the antenna.

Patent Publication 1: JP, A, 2003-208573 (Paragraphs 0015 to 0050, FIGS. 1 to 5)

In general, writing RFID tag information to a RFID circuit element involves a problem in a case of writing the information by using an unconditional writing command signal or the like. For example, in addition to the targeted RFID circuit elements to which the information is to be written, the information is also written to the IC circuit parts of other untargeted RFID circuit elements within the effective range of the radio signals transmitted from the antenna of the writing apparatus.

In particular, 125 kHz band and 13.56 MHz band used for communication with RFID tags provide only a short communication area, and therefore the use of the bands leads to restrictions in their use. Accordingly, the use of higher frequency bands such as a UHF band etc (830 to 930 MHz band, 2.45 GHz band etc.), which are often used in Europe and America, is being studied. Such high frequency bands provide a longer communication area, hence the use of that exacerbates the problems.

In the arrangement disclosed in the above-described prior art, a long distance is provided between a tag tape roll and the antenna of the writing apparatus in order to avoid erroneous writing as described above, and thereby it is attempted to prevent undesired writing to the RFID circuit elements in the tag tape roll other than the target tag circuit element. Therefore the arrangement leads to a problem of enlarging a whole size of the writing apparatus.

SUMMARY OF THE INVENTION

It is an object of the present invention to provide an apparatus for communicating with a RFID tag capable of writing correctly RFID tag information to each writing target RFID circuit element to be written without enlarging the whole size of the apparatus.

BRIEF DESCRIPTION OF THE DRAWINGS

FIG. 5 is a functional block diagram which shows the functional configuration of a RFID circuit element To.

FIG. 6A is a top view of an example of the exterior of a RFID label T.

FIG. 6B is a bottom view of an example of the exterior of a RFID label T.

FIG. 7 is a lateral cross-sectional view taken along line VII-VII' in FIG. 6A.

DETAILED DESCRIPTION OF THE PREFERRED EMBODIMENTS

Description will be made below regarding an embodiment of the present invention with reference to the drawings.

Figure 1:
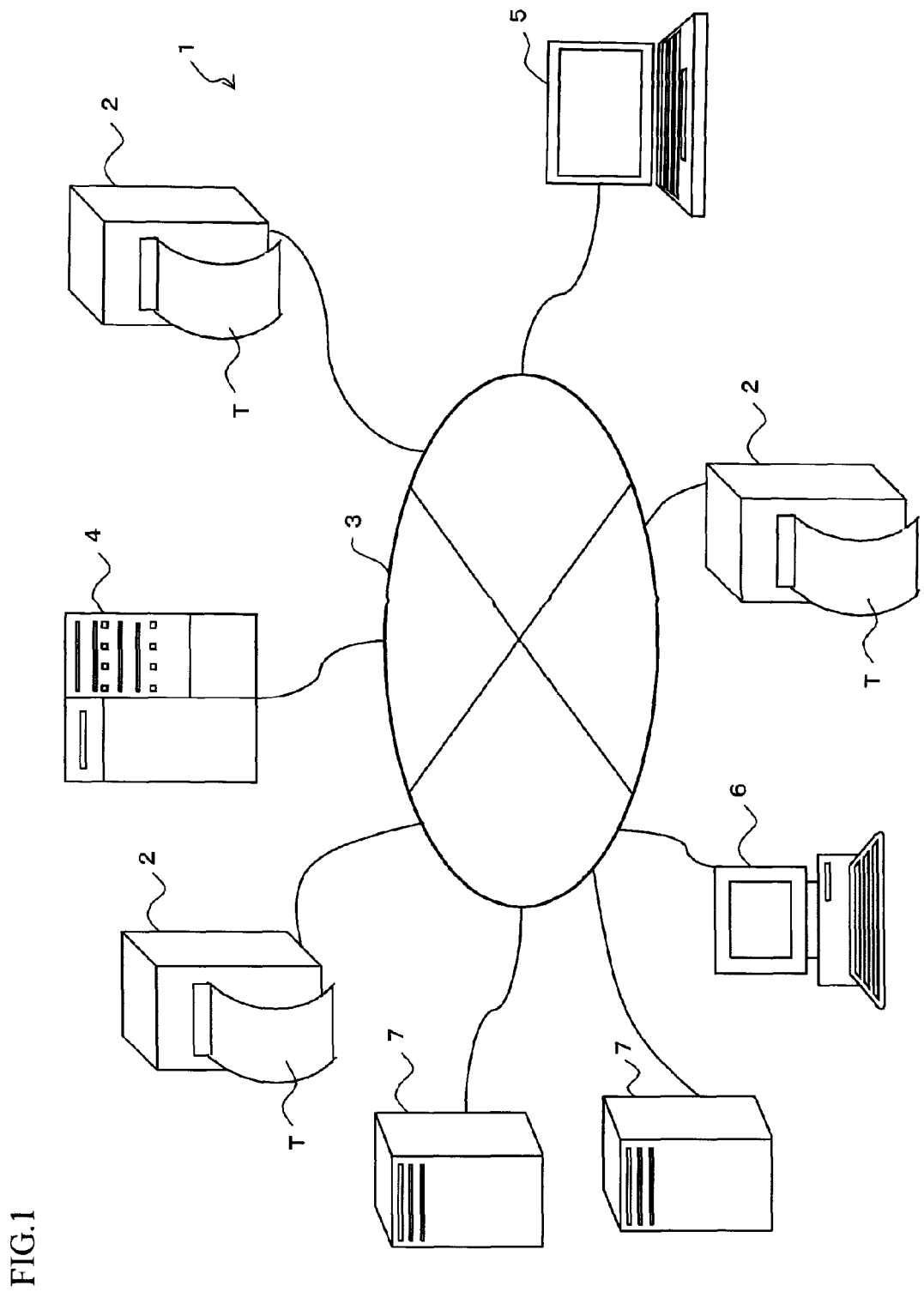
FIG. 1 is a system configuration diagram which shows a RFID tag creating system which applies an apparatus for communicating with a RFID tag according to an embodiment of the present invention.

FIG. 1 is a system configuration diagram which shows a RFID tag creating system which applies an apparatus for communicating with a RFID tag according to the present embodiment.

With a RFID tag creating system 1 shown in FIG. 1, an apparatus for communicating with a RFID tag (writing apparatus, tag label creating apparatus) 2 is connected to a route server 4, a terminal 5, a general purpose computer 6, and a plurality of information servers 7 via a communication line 3 in a wired or wireless manner.

Figure 2:
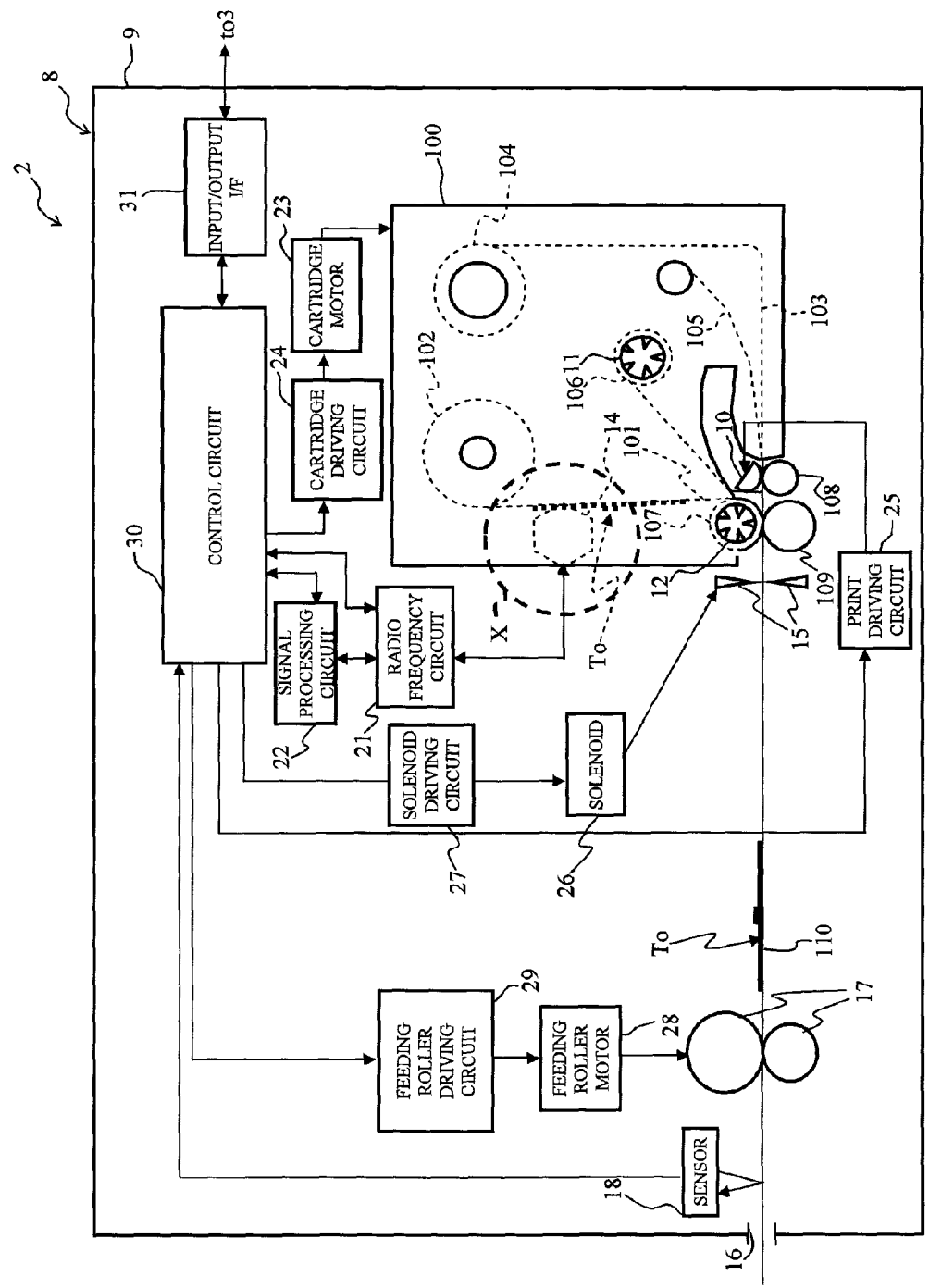
FIG. 2 is a conceptual configuration diagram which shows a detailed configuration of the apparatus for communicating with a RFID tag shown in FIG. 1.

FIG. 2 is a conceptual configuration diagram which shows a detailed configuration of the writing apparatus 2.

In FIG. 2, an apparatus main body 8 of the writing apparatus 2 includes a cartridge holder portion (not shown) formed in the shape of a recess. A cartridge 100 is detachably mounted to the holder portion.

The apparatus main body 8 includes a print head (thermal head) 10 (printing unit) configured to perform predetermined printing of a cover film (print receiving tape) 103 fed out from a second roll 104 (print receiving tape roll), a ribbon take-up roller driving shaft 11 configured to drive an ink ribbon after the printing of the cover film 103, a pressure roller driving shaft 12 (bonding unit, feeding unit) configured to adhere the cover film 103 to a base tape (tag tape, tag medium) 101 fed out from a first roll (tag tape roll, storage unit) 102, and to feed out the adhered tape from the cartridge 100 as a tag label tape 110 with print, an antenna (device antenna) 14 configured to transmit/receive signals to/from a RFID circuit element To included in the tag label tape 110 with print (detailed description will be described later) via wireless communication using a high frequency band such as a UHF band or the like, a cutter 15 configured to cut the tag label tape 110 with print at a predetermined timing and to a predetermined length, thereby forming label-shaped RFID labels T (detailed description will be described later), a feeding roller 17 configured to transport the RFID labels T to an output opening (discharge opening) 16, thereby outputting the RFID labels T, and a housing (body-housing) 9 which forms the exterior, and which has the cartridge holder portion that allows the cartridge 100 to be detachably mounted to the housing and the output opening 16.

The antenna 14 comprises a directional antenna having single-direction directivity (in this example, in the direction of the viewer in FIG. 2) (in this case, a known patch antenna is employed, and accordingly, drawing and description thereof will be omitted), disposed near to and alongside the axial direction of the first roll 102 (away from the viewer in FIG. 2) such that it provides a communication area X over which communication can be made via the antenna 14. The communication area X is provided near the tape feeding portion where the base tape 101 is fed from the first roll 102.

Also, the apparatus main body 8 includes a radio frequency circuit 21 configured to access (writing or reading) the RFID circuit element To via the antenna 14, a signal processing circuit 22 configured to process signals read out from the RFID circuit element To, a cartridge motor 23 configured to drive the ribbon take-up roller driving shaft 11 and the pressure roller driving shaft 12, a cartridge driving circuit 24 configured to control the driving of the cartridge motor 23, a print-head driving circuit 25 configured to control the supply of power to the print head 10, a solenoid 26 configured to drive the cutter 15 such that it performs the cutting operation, a solenoid driving circuit 27 configured to control the solenoid 26, a feeding roller motor 28 configured to drive the feeding roller 17, a control circuit 30 configured to control the radio frequency circuit 21, the signal processing circuit 22, the cartridge driving circuit 24, the print-head driving circuit 25, the solenoid driving circuit 27, the feeding roller driving circuit 29, and so forth, thereby controlling the operation of the overall system of the writing apparatus 2.

The control circuit 30 is a so-called microcomputer. While detailed description thereof will be omitted, the control circuit 30 comprises a CPU which is a central computation processing unit, ROM, RAM, and so forth, and performs signal processing according to a program stored beforehand in the ROM using the temporary storage function provided by the RAM. Furthermore, the control circuit 30 is connected to the communication line via the input/output interface 31, for example. Such an arrangement allows the control circuit 30 to exchange information with the route server 4, the other terminals 5, the general purpose computer 6, the information server 7, etc.

Figure 3:
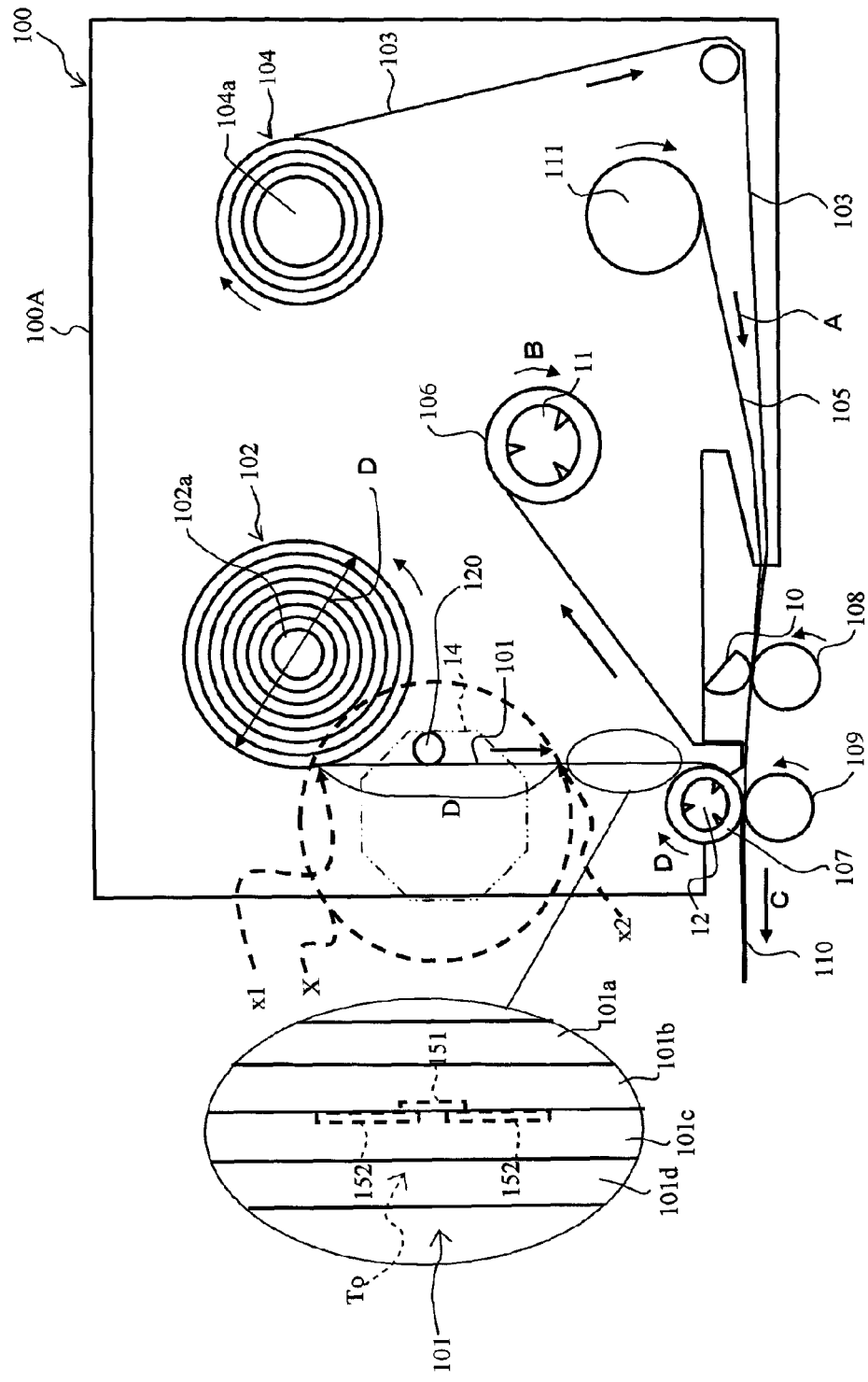
FIG. 3 is an explanatory diagram for describing the detailed configuration of the cartridge shown in FIG. 2.

FIG. 3 is an explanatory diagram for describing the detailed configuration of the cartridge 100.

In FIG. 3, the cartridge 100 comprises a housing 100A, the first roll 102, around which the strip base tape is wound, and which is disposed within the housing 100A, the second roll 104, around which the transparent cover film 103 is wound, with approximately the same width as that of the base tape 101, a ribbon supply roll 111 configured to supply the ink ribbon 105 (heat transfer ribbon, which can be eliminated in a case of employing a thermo-sensitive tape as the cover film), a ribbon take-up roller 106 configured to rewind the ribbon 105 after the printing, and a pressure roller 107 configured to adhere the base tape 101 and the cover film 103 to each other by applying pressure and transport the tag label tape 110 with print thus formed in the direction of the arrow A (i.e., serving as a feeding roller).

The first roll 102 stores, in a manner such that it is wound around a reel member 102a, the base tape 101, which has a structure in which a plurality of RFID circuit elements To are serially formed at a predetermined pitch along the longitudinal direction.

The base tape 101 has a four-layer structure (see partial enlarged view in FIG. 3) comprising an adhesive layer 101a formed of an suitable adhesive material, a colored base film 100b formed of PET (polyethylene terephthalate) or the like, an adhesive layer 101c formed of an suitable adhesive material, and a separation sheet 101d. The four layers of the base tape 101 are layered in that order from the layer that corresponds to the inner side of the rolled tape (the rightmost layer in FIG. 3) to the layer that corresponds to the opposite side (the leftmost layer in FIG. 3).

The base film 101*b* includes antennas (tag antennas) 152 configured to transmit/receive information, disposed on the back face of the base film 101*b* (on the left side in FIG. 3) such that they and the base film 101*b* form a single member. Furthermore, an IC circuit part 151 configured updatably (rewritably) to store information is formed such that it is connected to each tag antenna 152, thereby forming individual RFID circuit elements To.

The adhesive layer 101*a* is formed on the front face (right side in FIG. 3) of the base film 101*b*, which enables the cover film 103 to be adhered in the following step. Furthermore, the separation sheet 101*d* is adhered to the base film 101*b* through the adhesive layer 101*c* provided on the back face of the base film 101*b* (left side in FIG. 3) so as to include the RFID circuit elements To. Note that the user peels off the separation sheet 101*d* when the user adheres the RFID label T as a finished product to an inventory item or the like, thereby adhering the RFID label T to the inventory item or the like.

The second roll 104 stores the cover film 103 such that it is wound around a reel member 104*a*. The cover film 103 is supplied from the second roll 104. The ribbon 105 is supplied on the back side of the cover film 103 (i.e., on the face of the side which is to be adhered to the base tape 101), and is driven by the ribbon supply roll 111 and the ribbon winding roll 106. The ribbon 105 thus supplied is pressed by the print head 10, thereby coming into contact with the back face of the cover film 103.

The cartridge motor 23 (see FIG. 2 described above), which is a pulse motor externally provided to the cartridge 100, transmits driving force to each of the ribbon take-up roller driving shaft 11 and the pressure roller driving shaft 12, thereby rotationally driving the ribbon take-up roller 106 and the pressure roller 107.

With the cartridge 100 having the configuration, the base tape 101 fed out from the first roll 102 is supplied to the pressure roller 107. On the other hand, the ink ribbon 105 is driven so as to be located on the back face side (i.e., the face of the side which is to be adhered to the base tape 101) of the cover film 103 fed out from the second roll 104. Furthermore, the ink ribbon 105 thus driven is pressed by the print head 110, thereby being brought into contact with the back face of the cover film 103.

With such an arrangement, upon shifting the roll holder (not shown) from the separate position to the contact position after mounting the cartridge 100 to the cartridge holder portion of the apparatus main body 8, the cover film 103 and the ink ribbon 105 are held by the nip between the print head 10 and the platen roller 108, and the base tape 101 and the cover film 103 are held by the nip between the pressure roller 107 and a sub roller 109 (bonding unit). Then, the ribbon take-up roller 106 and the pressure roller 107 are synchronously rotationally driven along the directions denoted by the arrow B and the arrow C, respectively, by the driving force provided from the cartridge motor 23. Furthermore, the pressure roller driving shaft 12, the sub roller 109, and the platen roller 108 are connected to one another by a gear set (not shown). With such an arrangement, upon driving the pressure roller driving shaft 12, the pressure roller 107, the sub roller 109, and the platen roller 108 rotate, thereby fed out the base tape 101 from the first roll 102. The base tape thus fed out is supplied to the pressure roller 107 as described above. On the other hand, the cover film 103 is fed out from the second roll 104. At the same time, power is supplied to a plurality of heater elements provided to the print head 10 from the print-head driving circuit 25. As a result, printing is performed, thereby forming printed letters R (see FIG. 7 described later) on the back face of the cover film 103. Then, the base tape 101 and the printed cover film 103 are adhered (crimped) to each other by the pressure roller 107 and the sub roller 109 so as to form a single tape, thereby forming the tag label tape with print. The tag label tape with print thus formed is transported to outside the cartridge 100. Note that the ink ribbon 105 is rewound by the driving force provided from the ribbon take-up roller driving shaft 11 after the printing of the cover film 103. Furthermore, a guide roller 120 (guide unit) is disposed near the feeding portion of the first roll 102. The guide roller 120 maintains the position of the antenna 14 of the writing apparatus 2 relative to the RFID label T regardless of the change in the outer diameter of the first roll 102 due to the amount of the tape remaining in the first roll 102. This maintains the communications conditions between the antenna 14 of the writing apparatus and the RFID circuit element To.

Figure 4:
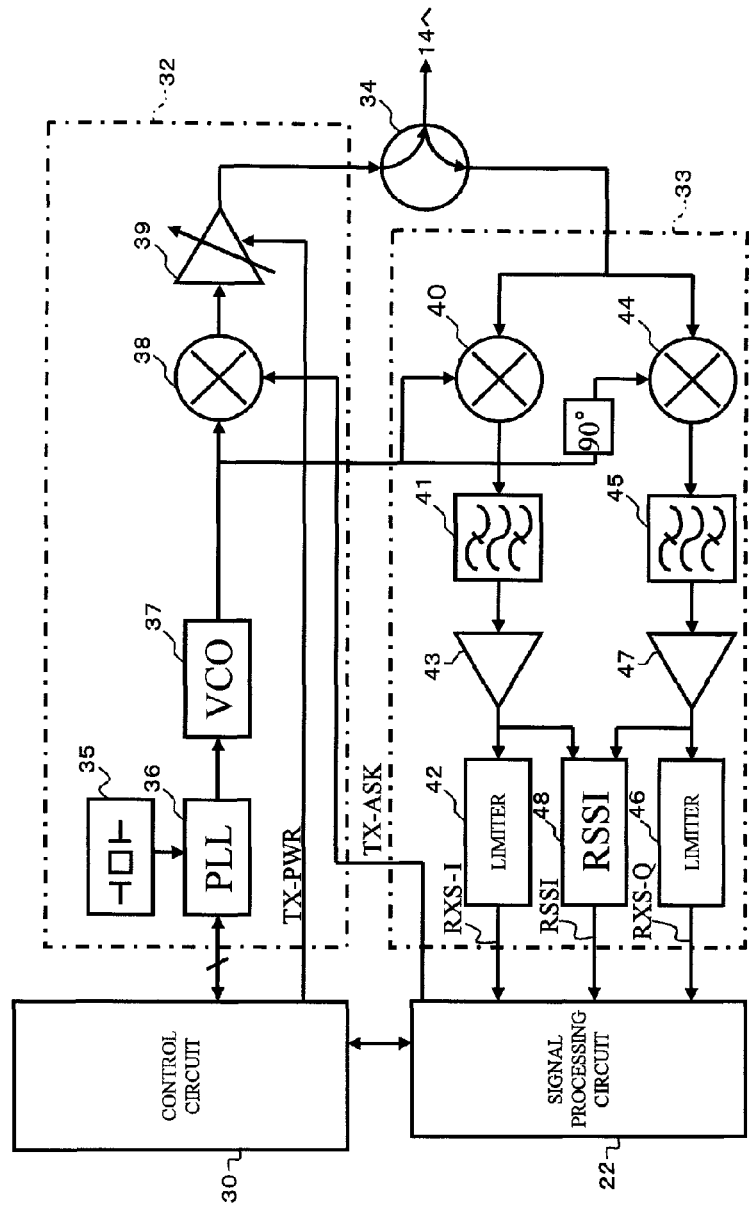
FIG. 4 is a functional block diagram which shows the functions of a radio frequency circuit shown in FIG. 3 in detail.

FIG. 4 is a functional block diagram which shows the functions of the radio frequency circuit 21 in detail. In FIG. 4, the radio frequency circuit 21 comprises a transmitting portion 32 configured to transmit signals to the RFID circuit element To via the antenna 14, a reception unit 32 configured to receive the reflected waves from the RFID circuit element To via the antenna 14, and a transmit-receive splitter 34.

The transmitting portion 32 includes a quartz oscillator 35 configured to generate carrier waves for carrying out making an access (read or write) the RFID tag information stored in the IC circuit part 151 of the RFID circuit element To, a PLL (Phase Locked Loop) 36, a VCO (Voltage Controlled Oscillator) 37, a transmission multiplying circuit 38 (note that, in a case of amplitude modulation, it may be replaced by an amplitude factor variable amplifier or the like) configured to modulate (in this case, amplitude modulation according to the "TX_ASK" signal supplied from the signal processing circuit 22) the carrier waves (RFID tag information) generated as described above according to a signal supplied from the signal processing circuit 22, and a variable transmission amplifier 39 configured to amplify the modulated waves modulated by the transmission multiplying circuit 38 with an amplification factor determined according to a "TX_PWR" signal supplied from the control circuit 30. With such an arrangement, the UHF frequency band is preferably employed for the carrier waves generated as described above. The output signal from the transmission amplifier 39 is transmitted to the antenna 14 via the transmit-receive splitter 34, whereby the output signal is supplied to the IC circuit part 151 of the RFID circuit element To. Note that the RFID tag information is not restricted to the signals thus modulated. In some cases, non-modulated carrier wave is transmitted as the RFID tag information.

The receiving portion 33 includes a first receiving signal multiplying circuit 40 configured to multiply the reflected waves received from the RFID circuit element To via the antenna 14 by the carrier waves generated as described above, a first band-pass filter 41 configured to extract only the signals within the necessary frequency band range from the output signals received from the first receiving signal multiplying circuit 40, a first receiving signal amplifier 43 configured to amplify the output signal from the first band-pass filter 41 and supplying the output signal thus amplified to a first limiter 42, a second receiving signal multiplying circuit 44 configured to multiply the reflected waves received from the RFID circuit element To via the antenna 14 by the carrier waves that have been delayed by a phase angle of 90° after having been generated as described above, a second band-pass filter 45 configured to extract only the signals within the necessary frequency band range from the output signals of the second receiving signal multiplying circuit 44, and a second receiving signal amplifier 47 configured to amplify the output signal input from the second band-pass filter 45, and supplying the signal thus amplified to a second limiter 46. With such an arrangement, the signal "RXS-I" output from the first limiter 42 and the signal "RXS-Q" output from the second limiter 46 are input to the signal processing circuit 22, whereupon these signals are processed by the signal processing circuit 22.

Furthermore, the output signals from the first receiving signal amplifier 43 and the second receiving signal amplifier 47 are input to an RSSI (Received Signal Strength Indicator) circuit 48. With such an arrangement, the signal "RSSI" which indicates the magnitude of these signals is input to the signal processing circuit 22. As described above, the writing apparatus 2 according to the present embodiment performs demodulation of the reflected waves from the RFID circuit element To by I-Q quadrature demodulation.

Figure 5:
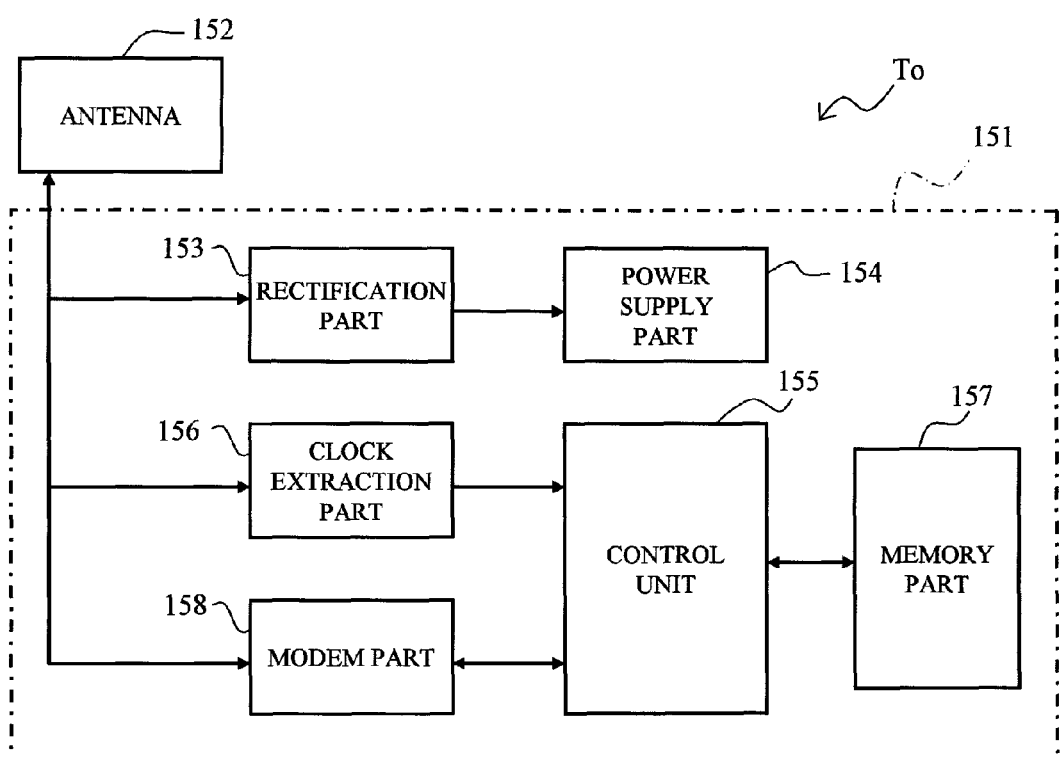

FIG. 5 is a functional block diagram which shows the functional configuration of the RFID circuit element To. In FIG. 5, the RFTD circuit element includes the antenna 152 configured to transmit/receive signals in a non-contact manner using high-frequency radio waves of the UHF frequency band or the like, and the IC circuit part 151 connected to the antenna 152.

The IC circuit part 151 includes a rectification part 153 configured to rectify the carrier waves received via the antenna 152, a power source part 154 configured to store the energy of the carrier waves thus rectified by the rectification part 153, which serves as a driving power supply, a clock extraction part 156 configured to extract the clock signals from the carrier waves thus received by the antenna 152, and supplying the clock signals thus extracted to a control unit 155, a memory part 157 configured to store predetermined information signals, a modem part 158 connected to the antenna 152, and the control unit 155 configured to control the operation of the RFID circuit element To via the rectification part 153, the clock extraction part 156, the modem part 158, etc.

The modem part 158 performs demodulation of communication signals which have been transmitted from the antenna 14 of the writing apparatus 2, and which have been received via the antenna 152. Also, the modem part 158 performs modulation of the carrier waves received via the antenna 152 according to a response signal from the control unit 155, and the carrier waves thus modulated are transmitted as reflected waves.

The control unit 155 analyzes the received signals demodulated by the modem part 158, creates the response signals based upon the information signals stored in the memory part 157, and executes basic control such as the control for instructing the modem part 158 to transmit a response signal.

FIGS. 6A and 6B are diagrams which show an example of the exterior of a RFID label T cut off from the tag label tape 110 with print after information writing as described above. FIG. 6A is a top view, and FIG. 6B is a bottom view. On the other hand, FIG. 7 is a lateral cross-sectional view taken along line VII-VII' in FIG. 6A.

As shown in FIGS. 6A, 6B, and 7, the RFID label T has a five-layer structure in which the cover film 103 is provided to the four-layer structure shown in FIG. 3. Specifically, the five-layer structure comprises the cover film 103, the adhesive layer 101a, the base film 101b, the adhesive layer 101c, and the separation sheet 101d, in that order from the side of the cover film 103 (upper side in FIG. 7) to the opposite side (lower side in FIG. 7). Furthermore, as described above, the RFID circuit elements To including the antennas 152 provided on the back side of the base film 101b are provided within the adhesive layer 101c. Furthermore, the printed characters R (which read "RF-ID" to indicate the kind of RFID label) are printed on the back of the cover film 103.

Figure 8:
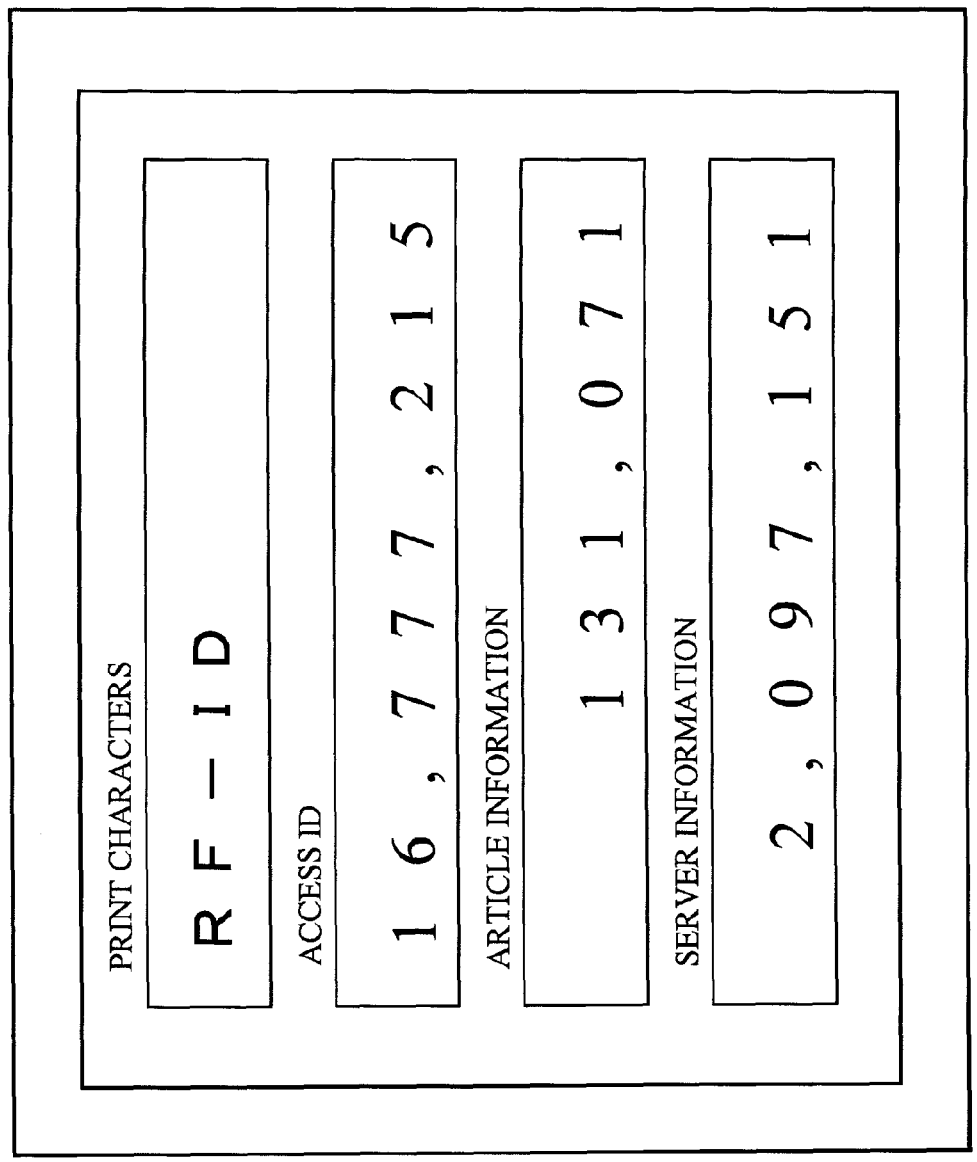
FIG. 8 is a diagram which shows an example of a screen displayed on a terminal or a general purpose computer when the RFID tag information is accessed.

FIG. 8 is a diagram which shows an example of a screen displayed on the terminal 5 or the general purpose computer 6 when the writing apparatus 2 accesses (reads or writes) RFID tag information stored in the IC circuit part 151 of the RFID circuit element To.

In FIG. 8, the printed characters R printed corresponding to each RFID circuit element To, an access (writing/reading) ID which is the unique ID of each RFID circuit element To, an inventory item information address stored in the information server 7, a storage destination address of the corresponding information stored in the route server 4, etc. are able to be displayed at the terminal 5 or the general purpose computer 6. With such an arrangement, upon operating the terminal 5 or the general purpose computer 6, the writing apparatus 2 operates. Specifically, the printed characters R are printed on the cover film 103. Furthermore, the information such as the writing ID and the inventory item information is written to the IC circuit part 151 (in other words, the RFID tag information such as the inventory item information stored beforehand in the IC circuit part 151 is read out).

In the writing step (or readout step), the correspondence between the ID of each RFID label T thus formed and the information read out from (or written to) the IC circuit part 151 of the RFID label T is stored in the route server 4. With such an arrangement, the correspondence can be used as reference data as required.

The most important feature of the writing apparatus 2 according to the present embodiment is that the RFID tag information is written to the IC circuit part 151 of the RFID circuit element To from the antenna 14 within a communication area X formed within the cartridge 100. The communication area X is positioned near the tape feeding portion where the base tape 101 is fed from the first roll 101.

Figure 9:
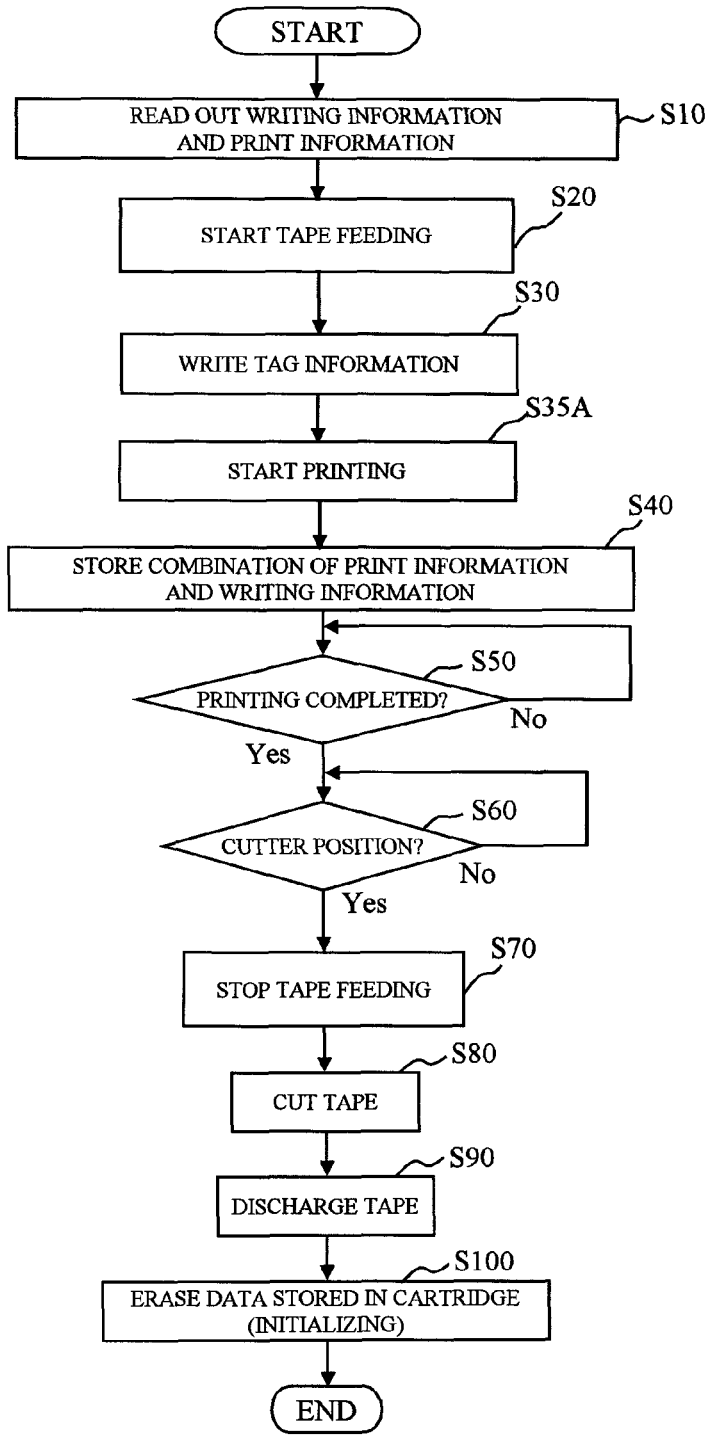
FIG. 9 is a flowchart which shows a control procedure executed by a control circuit.

FIG. 9 is a flowchart which shows a control procedure executed by the control circuit 30, which includes a step for instructing the print head 10 to perform printing of the cover film 103 while feeding the cover film 103, a step for adhering the base tape 101, to which predetermined RFID tag information has been written via the antenna 14, to the cover film 103 so as to form the tag label tape 110 with print, and the subsequent step for cutting off the tag label tape 110 with print in increments of the RFID circuit elements To so as to form the RFID labels T.

In FIG. 9, upon performance of the writing operation by the writing apparatus 2, the flow starts. First, in Step S10, the RFID tag information, which is to be written to the IC circuit part 151 of the RFID circuit element To via the antenna 14 and which is input by operating the terminal 5 or the general purpose computer 6. Then the printing information for instructing the print head 10 to print the RFID label T are read out via the communication line 3 and the input/output interface 31.

Subsequently, in Step S20, a control signal is output to the cartridge driving circuit 24, whereupon the ribbon take-up roller 106 and the pressure roller 107 are rotationally driven by the driving force provided from the cartridge motor 23. Thus, the base tape 101 is fed out from the first roll 102, and is supplied to the pressure roller 107. At the same time, the cover film 103 is fed out from the second roll 104. Furthermore, a control signal is output to the feeding roller motor 28 via the feeding roller driving circuit 29 so as to rotationally drive the feeding roller 17. As a result, the tapes 101, 103, and 110 are driven such that the base tape 101 and the cover film 103 (after the printing step as described above) are adhered to each other by the pressure roller 107 and the sub roller 109, thereby forming a tape in the form of a single member. With such an arrangement, the tape thus formed, which is the tag label tape 110 with print, is transported to outside the cartridge 100.

Next, in Step S30, the RFID tag information is transmitted to and is written to the RFID circuit element To. Specifically, a "Program" command for writing desired data to the memory part 157, is output to the signal processing circuit 22. The signal processing circuit 22 creates a "Program" signal, which is RFID tag information including the ID information that is the target information to be written, based upon the "Program" command. The "Program" signal thus created is transmitted to the RFID circuit element To which is the information writing target, via the radio frequency circuit 21, whereby the information is written to the memory part 157.

Then, the flow proceeds to Step S35A, where a control signal is output to the print-head driving circuit 25 so as to supply power to the print head 10. In this step, the power is supplied such that printed characters R such as letters, symbols, barcodes, or the like, read out in Step S10 are printed in a predetermined region on the cover film 103 (e.g., the region which is to be adhered to the back face of each of the RFID circuit elements To disposed on the base tape 101 at a predetermined pitch and at a constant interval). After the completion of Step S35A, the flow proceeds to Step S40.

In Step S40, the combination of the RFID tag information written to the RFID circuit element To in the Step S30 and the printed information printed by the print head 10 corresponding to the RFID tag information is output to the terminal 5 or the general purpose computer 6 via the input/output interface 31 and the communication line 3. The combination of these information sets is stored in the information server 7 or the route server 4. Note that the data thus stored is stored in a database in a manner that allows the data thus stored to be used as reference data via the terminal 5 or the general purpose computer 6 as necessary.

Subsequently, in Step S50, confirmation is made whether or not printing has been completed for the entire region of the cover film 103 that corresponds to the RFID circuit element To which is the processing target at the current point in time. After the confirmation, the flow proceeds to Step S60.

In Step S60, decision is made whether or not the tag label tape 110 with print has been transported to a predetermined position where it is to be cut off by the cutter 15. Specifically, an arrangement may be made in which decision is made whether or not the RFID circuit element To which is the target and the entire printed region of the cover film 103 that corresponds to the RFID circuit element To have extended beyond the position of the cutter 15 to a predetermined length (margin) by detecting an suitable identification mark provided to the base tape 101 (in other words, the identification mark may be provided to the separation sheet 101d, the cover film 103, or the like), which corresponds to each RFID circuit element To, using a known tape sensor externally provided to the cartridge 100 (e.g., at a position further downstream of the cutter 15 along the transport direction). Alternatively, an arrangement may be made in which decision is made whether or not the sum of the length of the printed characters R and the margin exceeds the overall length of the RFID circuit element To based upon the printing information, instead of the detection. With such an arrangement, in a case that the sum of the length of the printed characters and the margin exceeds the overall length of the RFID circuit element To, the region that exceeds the margin is cut by the cutter 15 in the stage in which the printing of the cover film 103 has been completed. Even in the worst case, this protects against cutting the RFID circuit element To, which is to be adhered to the cover film 103.

In a case that decision has been made that the condition has been satisfied, the flow proceeds to Step S70. In Step S70, control signals are output to the cartridge driving circuit 24 and the feeding roller driving circuit 29 so as to stop the driving of the cartridge motor 23 and the feeding roller motor 28. As a result, the rotations of the ribbon take-up roller 106, the pressure roller 107, and the feeding roller 17 are stopped. Accordingly, the feeding out of the base tape 101 from the first roll 102, the feeding out of the cover film 103 from the second roll 104, and the transport of the tag label tape 110 with print by the feeding roller 17 are stopped.

Subsequently, in Step S80, a control signal is output to the solenoid driving circuit 27 so as to drive the solenoid 26. In this step, the solenoid 26 is driven such that the tag label tape 110 with print is cut off by the cutter 15. As described above, at this point in time, the RFID circuit element To, which is the processing target, and the entire printed region of the cover film 103 that corresponds to the RFID circuit element To sufficiently extend beyond the position of the cutter 15. Thus, a label-shaped RFID label T, which includes the RFID circuit element To from which the RFID tag information has been read out, and on which printing has been performed corresponding to the RFID tag information thus read out, is formed by cutting the tag label tape 110 with print using the cutter 15.

Subsequently, the flow proceeds to Step S90 where a control signal is output to the feeding roller driving circuit 29 so as to drive the feeding roller motor 28 again, thereby rotating the feeding roller 17. As a result, the feeding roller 17 begins transport again. Accordingly, the RFID label T thus formed in the shape of a label in the Step S150 is transported toward the discharge opening 16, and the RFID label T is thereby discharged to outside the apparatus 2 via the discharge opening 16.

Lastly, in Step S100, the RFID tag information stored in the IC circuit part 151 of all the RFID circuit element To remaining within the communication area (the communication area X described above) provided within the cartridge 100 is erased (initialized). Specifically, an "Erase" command for initializing the information stored in the memory part 157 of the RFID circuit element To, is output to the signal processing circuit 22. Then, the signal processing circuit 22 creates an "Erase" signal based upon the "Erase" command. The "Erase" signal is transmitted to all the RFID circuit elements To remaining within the communication range (the communication area X) via the transmitting portion 32 of the radio frequency circuit 21 and the antenna 14, thereby initializing the memory units 157.

With such an arrangement described above, the signal processing circuit 22 and the high frequency circuit transmitting portion 32 form information creating unit configured to create the RFID tag information which is to be written to the IC circuit part as described in each of the appended claims. Also, the signal processing circuit 22 and the high frequency circuit transmitting portion 32 form initializing command creating unit configured to create an initializing command signal that initializes the RFID tag information written to the IC circuit part.

On the other hand, the control circuit 30 forms controller configured to control the information creating unit, the feeding unit, and the initializing command creating unit such that the RFID tag information is created by the information crating unit, and the tag tape is driven in the feeding direction, following which an initializing command signal is created by the initializing command creating unit.

With the writing apparatus 2 according to the present embodiment as described above, in the step in which the RFID tag information is written to each RFID circuit element To, RFID tag information is created by the signal processing circuit 22 and the high frequency circuit transmitting portion 32 corresponding to the RFID circuit element To, following which the RFID tag information is transmitted by wireless communication to the antenna 152 of the RFID circuit element To mounted on the base tape 101. The RFID tag information thus transmitted is written to the IC circuit part 151.

Here, a plurality of RFID circuit elements To are serially disposed on the base tape 101 wound around the first roll 102 stored within the cartridge 100. In some case, such an arrangement provided without any additional steps may lead to a problem as follows. That is to say, the RFID tag information is written to untargeted RFID circuit elements To positioned near the target RFID circuit elements To. However, the writing apparatus 2 is configured to be able to update (rewrite) the information stored in the IC circuit part 151 of each RFID circuit element To. Furthermore, the antenna 14 is disposed at a position that allows communication to be made with each RFID circuit element To within the communication area X, near the tape feeding portion of the first roll 102. With such an arrangement, the communication area X is a part of the path through which the continuously fed out base tape 101 passes. As a result, Two steps described as follows are repeatedly performed. Namely, in Step 30, undesired RFID tag information with respect to other prior RFID circuit elements To is written to each RFID circuit element To (which corresponds to erroneous writing). After that, in Step S100, the undesired information thus written is erased (initializing). The two steps 30 and 100 are repeatedly performed while the RFID circuit elements To are transported along the direction with the base tape 101 fed out/transported within the communication area X. In the final stage, i.e., immediately before the RFID circuit element To exits the communication area X, the correct RFID tag information is written to the corresponding RFID circuit element To (in this step, and in the same way, RFID tag information is erroneously written to a plurality of subsequent RFID circuit elements To). Then, the RFID circuit element To is transported to the cutter position 150 external to the cartridge 100 where the cutting is performed by the cutter 15 in Steps S60 and S70. Then, cutting is performed in Step S80, and the RFID label thus formed is discharged in Step S90. With such an arrangement, the RFID tag information stored in the RFID circuit element To positioned outside the communication area provided by the antenna 14 is not erased (initialized) in Step S100, thereby producing a RFID label T that stores the correct RFID tag information.

As described above, with such an arrangement, even if other RFID tag information that does not accord with the target RFID circuit element To has been erroneously written to the target RFID circuit element, the RFID tag information thus erroneously written is erased (initialized). And the correct RFID tag information, which is to be written, is written to the target RFID circuit element To in the final stage. Thus, the RFID circuit element To storing the correct RFID tag information is discharged outside of the cartridge 100.

Thus, with the apparatus 2 according to the present embodiment, it is achieved to write the corresponding correct RFID tag information to each RFID circuit element To without disposing the first roll 102 and the antenna 14 at a great distance from each other, unlike the conventional structures. Namely, the first roll 102 and the antenna 14 can be disposed at positions relatively close to each other (in this arrangement, the antenna 14 is provided near to and alongside the shaft of the first roll 102). Such an arrangement provides a small-sized overall system.

Furthermore, the apparatus 2 according to the present embodiment includes the first roll 102, around which the base tape 101 including the RFID circuit elements To have been wound, in the form of a cartridge, as compared with a modification involving no cartridge described later in (3). Such an arrangement provides the advantage of allowing the user to replace the base tape 101 (and the cover film 103) easily in a simple manner.

Note that various modifications may be made according to the present embodiment without departing from the spirit and scope of the invention, in addition to the above-described embodiment. Description will be made sequentially below regarding such modifications.

(1) Modification with Handling a Writing Error

Figure 10:
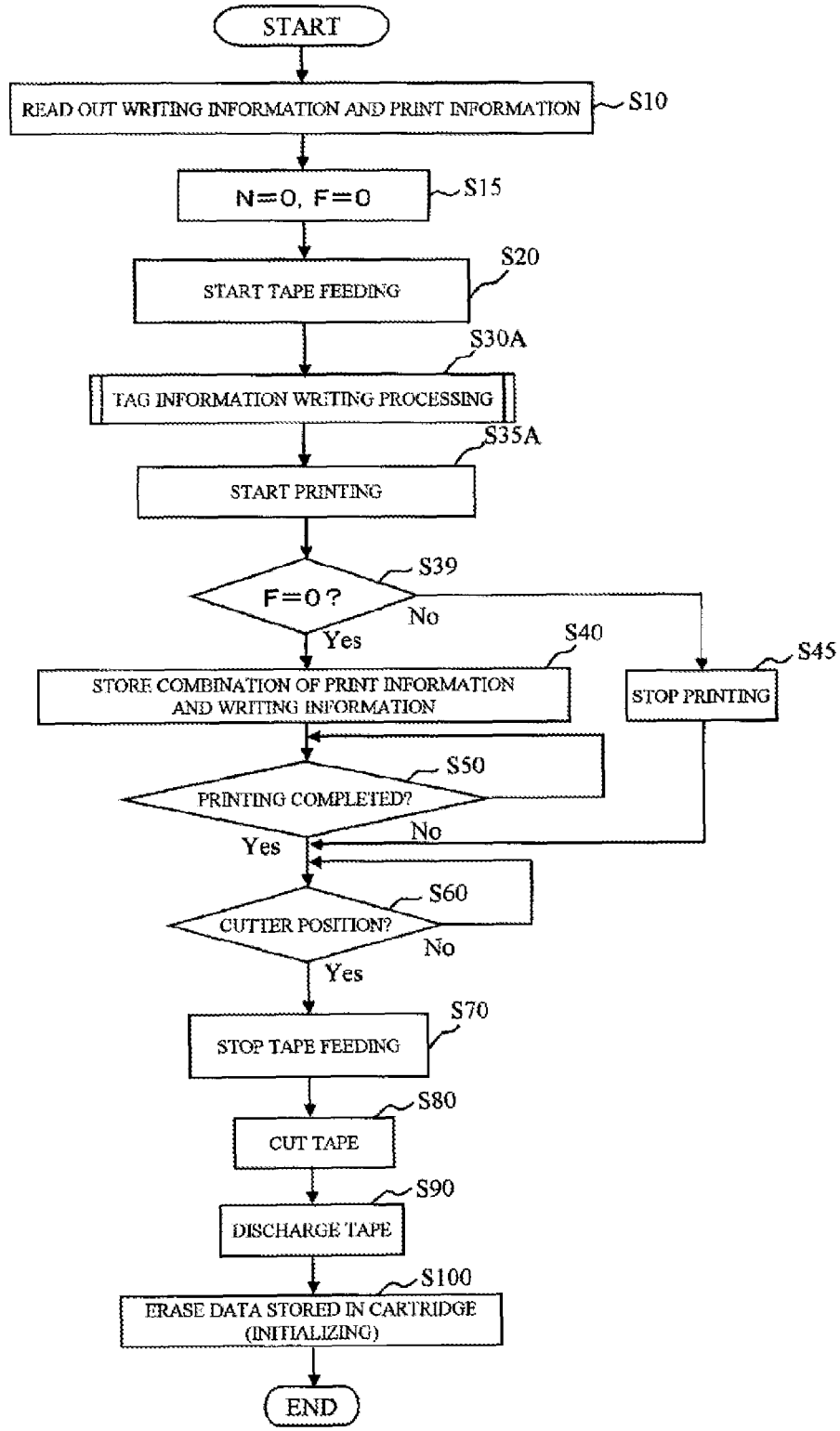
FIG. 10 is a flowchart which shows a control procedure executed by the control circuit according to a modification with the occurrence of a worst-case writing error.

FIG. 10 is a flowchart which shows a control procedure executed by the control circuit 30 according to such a modification. FIG. 10 corresponds to the flowchart shown in FIG. 9 according to the above-described embodiment. Note that the same steps are denoted by the same reference numerals, and description thereof will be omitted suitably.

With this modification shown in FIG. 10, first, in Step S10, the RFID tag information, which is to be written to the IC circuit part 151, and the printing information, which is to be printed by the print head 10, are read out.

Subsequently, the flow proceeds to Step S15, which is a newly provided step in this modification. In Step S15, the variable N and the flag F are initialized to zero. The variable N is used for counting the number of retries that are performed in the event that a sign of communication failure is detected, and the flag F indicates whether the communication succeeds or fails.

Subsequently, in step s20, the ribbon take-up roller 106 and the pressure roller 107 are rotationally driven, thereby starting transport of the tapes 101, 103, and 110.

Subsequently, the flow proceeds to Step S30A, which is a newly provided step in this modification. In Step S30A, writing processing is performed. Specifically, the RFID tag information is transmitted to and is written to the RFID circuit element To (detailed description will be made later with reference to FIG. 11). After the completion of Step S30A, the flow proceeds to Step S35A, where the characters R, which have been read out in Step S10, are printed by supplying power to the print head 10 in the same way as described above. Subsequently, the flow proceeds to Step S39, which is a newly provided step in this modification.

In Step S39, decision is made whether or not the flag F equals zero. In a case that the writing processing has been normally completed, the flag F equals zero (see Step S38 in the flow shown in FIG. 11 described later). Accordingly, in this case, a decision is made that the condition has been satisfied, and the flow proceeds to Step S40 in the same way as in FIG. 9.

In Step S40, the combination of the RFID tag information written to the RFID circuit element To as described above and the printed information printed by the print head 10 is stored in the information server 7 or the route server 4. Subsequently, in Step S50, decision is made whether or not the printing has been completed in the same way as described above. Then, in Step S60, decision is made whether or not the RFID circuit element To has been transported up to the cutter position in the same way as described above.

Note that, in a case that if, due to any cause, the writing processing has not been normally completed, the flag F is set to 1 (see Step S38 in the flow shown in FIG. 11 described later). Accordingly, in this case, decision is made that the condition has not been satisfied, and the flow proceeds to Step S45 where a control signal is output to the print-head driving circuit 25 so as to stop the supply of power to the print head 10, whereupon the printing is stopped. With such an arrangement, in a case that the target RFID circuit element To is defective, the printing is stopped before being completed as described above, thereby notifying the user of the defect. Subsequently, the flow proceeds to the Step S60.

The Step S60 and the following steps are the same as those shown in FIG. 9, and accordingly, description thereof will be omitted.

Figure 11:
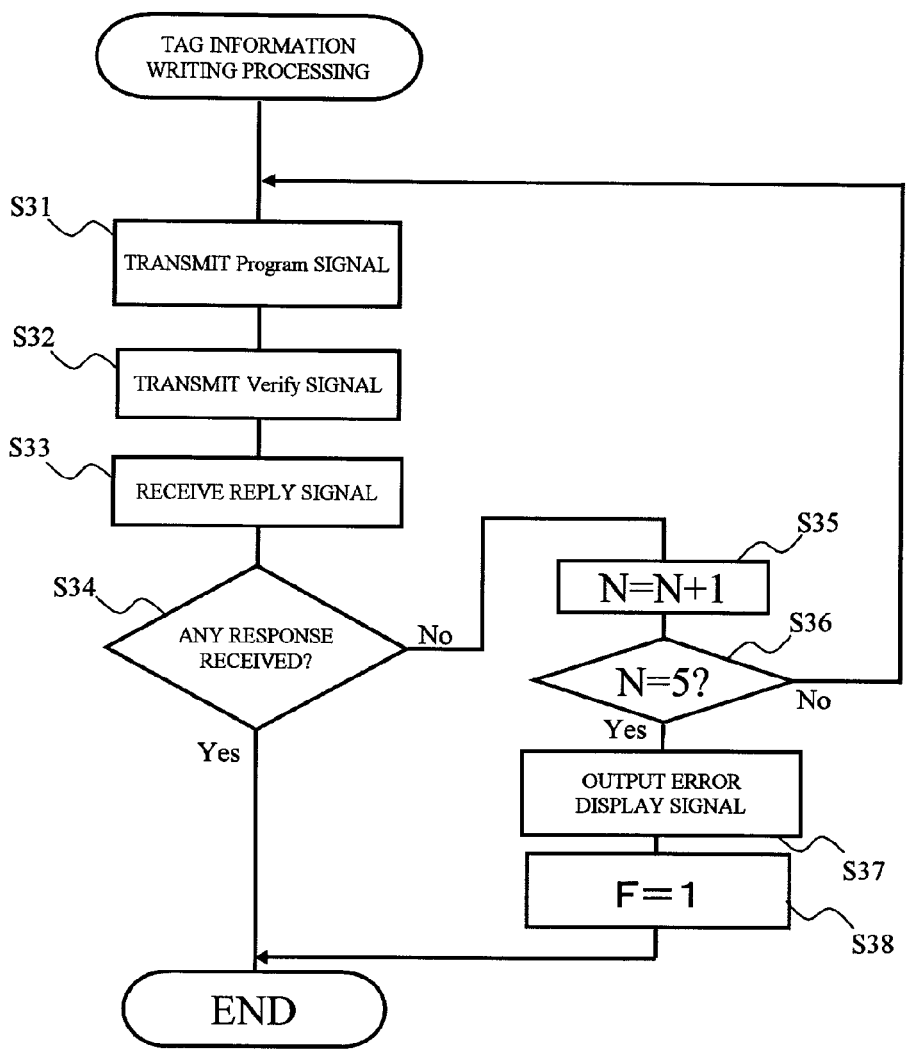
FIG. 11 is a flowchart which shows a detailed procedure of Step S30A shown in FIG. 10.

FIG. 11 is a flowchart which shows a detailed procedure of the Step S30A.

In FIG. 11, after the completion of the Step S20 shown in FIG. 10, first, the flow proceeds to Step S31 where a "Program" command for writing desired data to the memory part 157 is output to the signal processing circuit 22. The signal processing circuit 22 creates a "Program" signal, which is RFID tag information including the target ID information to be written, based upon the "Program" command. The "Program" signal thus created is transmitted to all the RFID circuit elements To within the communicable area (the communication area X) via the transmitting portion 32 of the radio frequency circuit 21 and the antenna 14. Accordingly, the corresponding information is written to the memory parts 157 in the RFID circuit elements To.

Subsequently, in Step S32, a "Verify" command for confirming the contents stored in the memory part 157 is output to the signal processing circuit 22. The signal processing circuit 22 creates a "Verify" signal based upon the "Verify" command. The "Verify" signal thus created is transmitted to all the RFID circuit elements To within the communication area via the transmitting portion 32 of the radio frequency circuit 21 and the antenna 14. The "Verify" Signal instructs each RFID circuit element To to transmit a response.

Then, the flow proceeds to Step S33 where a reply (response) signal transmitted from (replied by) each of all the RFID circuit elements To in response to the "Verify" signal is received via the antenna 14. The reply signals thus received are acquired via the receiving portion 33 of the radio frequency circuit 21 and the signal processing circuit 22.

Next, in Step S34, decision is made whether or not at least one valid reply signal (the signal which indicates that the information has been normally stored in the memory part 157) has been received from any one among all the RFID circuit elements To that remain in the communication area.

In a case that decision has been made that the condition has been satisfied, the information has been correctly written to at least one of the RFID circuit elements To that remain within the area X. In other words, a writing failure that affected all the RFID circuit elements To has not occurred. Accordingly, this routine ends. In a case that decision has been made that the condition has not been satisfied, the flow proceeds to Step S35 where the variable N is incremented by 1. Furthermore, the flow proceeds to Step S36 where decision is made whether or not the variable N is equal to 5. In a case that the variable N is equal to or less than 4, the condition has not been satisfied, and accordingly, the flow is returned to Step S31, and the same procedure is repeated. In a case that the variable N is equal to 5, the flow proceeds to the Step S37. In Step S37, an error display signal is output to the terminal 5 or the general purpose computer 6 via the input/output interface 31 and the communication line 3 so as to display the corresponding writing failure (error) notice. Subsequently, in Step S38, the flag F is set to 1, whereupon this routine ends. As described above, with such an arrangement, a maximum of five writing retries are performed even if the information writing fails.

As described above, in addition to the advantages of the above-described embodiment, the present modification provides the advantage as follows. Namely, retrying of the writing is carrying out to a predetermined maximum of N times (in the example, N=5) even if there is a worst-case failure in the information writing via the antenna 14 to the RFID circuit elements To in the area X. From the perspective of the writing reliability, such an arrangement ensures stable operations.

Furthermore, with the modification, the writing transmission power may be increased in increments of retries during the step in which retries are performed N times. Also, an arrangement may be made in which, in a case that the retries have failed after having been performed N times, a certain printing (warning printing) or the like, which indicates a writing failure (retry failure), is performed after the flag has been set to 1 in Step S38 in FIG. 11, instead of the processing in which the printing is stopped in Step S45 in FIG. 10.

(2) Variation of the Antenna Position

Figure 12:
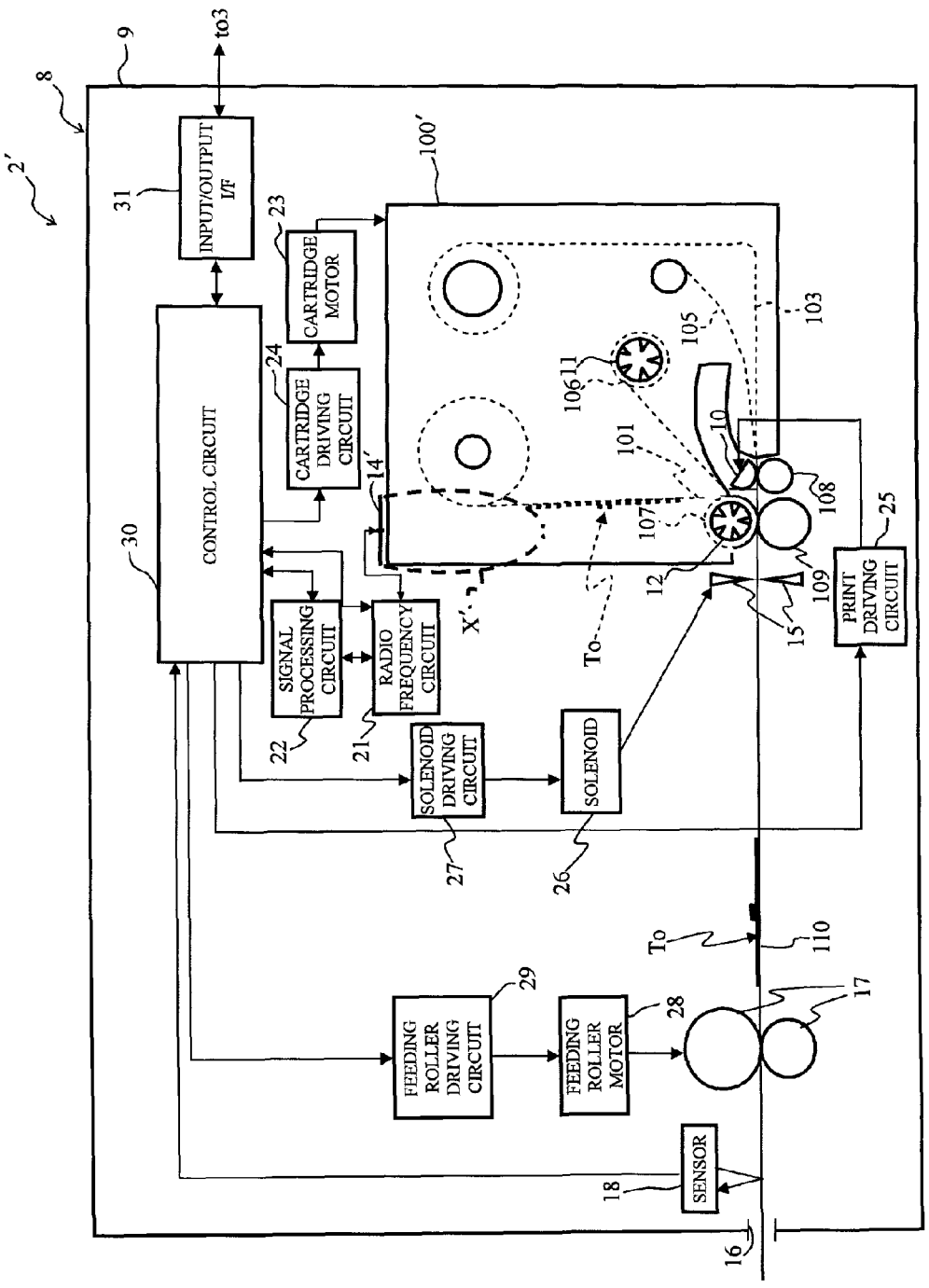
FIG. 12 is a conceptual configuration diagram which shows a detailed configuration of an apparatus for communicating with a RFID tag according to a modification in which the antenna is disposed at a different position.
Figure 13:
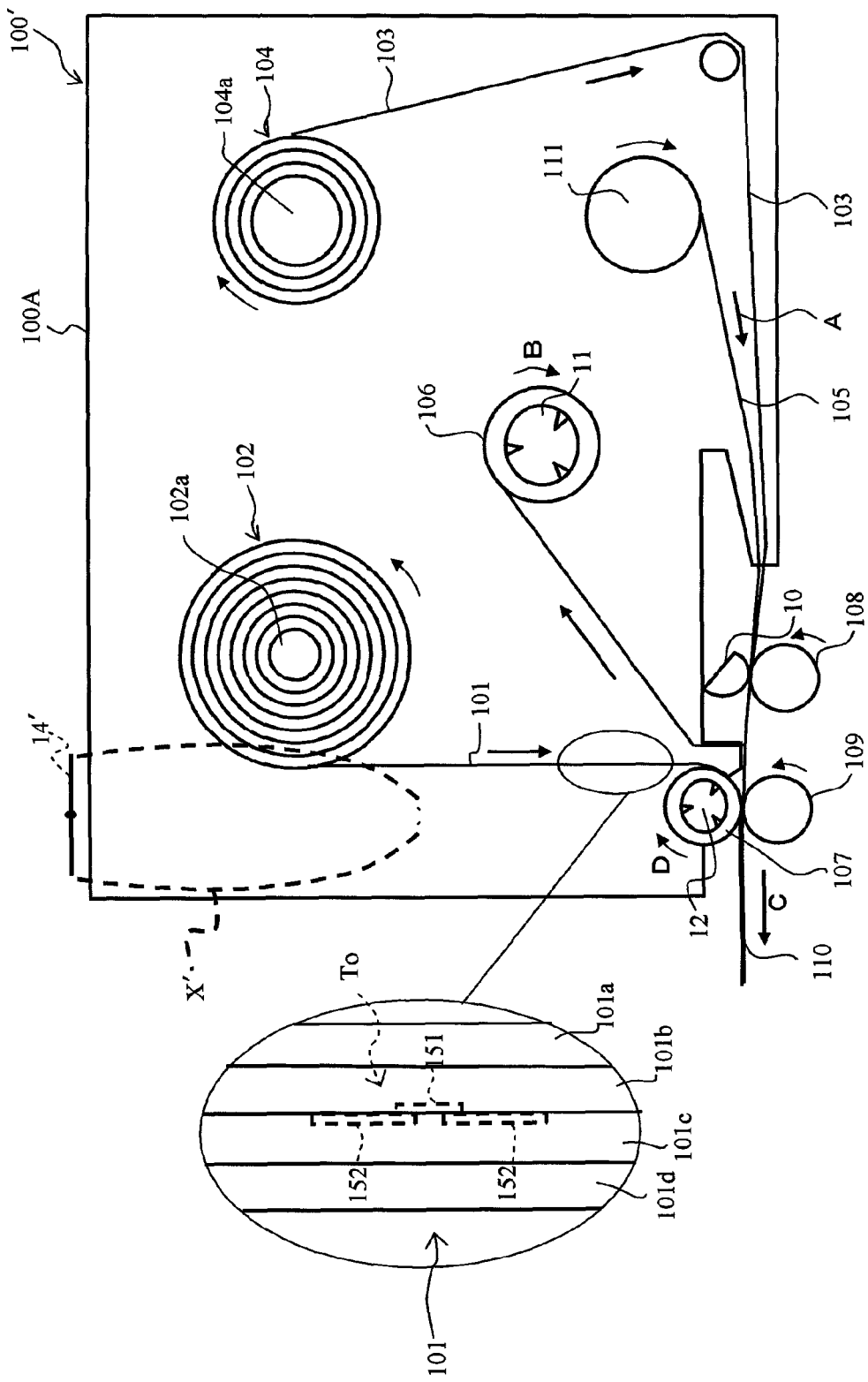
FIG. 13 is an explanatory diagram for describing a detailed configuration of a cartridge shown in FIG. 12.

FIG. 12 is a conceptual configuration diagram which appropriately corresponds to FIG. 2. of the above-described embodiment. FIG. 12 shows a detailed configuration of an apparatus 2' for communicating with a RFID tag according to a modification. In the modification, the antenna 14 is disposed at a different position. On the other hand, FIG. 13 is an explanatory diagram for describing a detailed configuration of a cartridge 100' shown in FIG. 12. FIG. 13 approximately corresponds to FIG. 3 showing the above-described embodiment. The same components as those shown in FIGS. 2 and 3 are denoted by the same reference numerals, and description thereof will be omitted suitably.

With the modification shown in FIGS. 12 and 13, the antenna 14' comprises a directional antenna (patch antenna) having single-direction directivity (in this example, the downward direction in FIGS. 12 and 13). The antenna 14' is disposed near to and alongside the radial direction of the first roll 102 (the upward direction in FIGS. 12 and 13). With the arrangement, the antenna 14' provides a communication area X'. The communication area X' is provided near the tape feeding portion where the base tape 101 is fed from the first roll 102.

With the present modification, writing is also performed for the RFID circuit elements To mounted on the base tape 101 positioned within the communication area X' via the antenna 14' provided near to and alongside the radial direction of the first roll 102. Such a modification provides the same advantage as that described in the above-described embodiment. That is to say, the modification has the advantage of writing the correct RFID tag information to each RFID circuit element To without disposing the first roll 102 and the antenna 14' at a great distance from each other. Accordingly, it can be achieved to offer a small-sized overall system.

(3) Modification with No Cartridge

Figure 14:
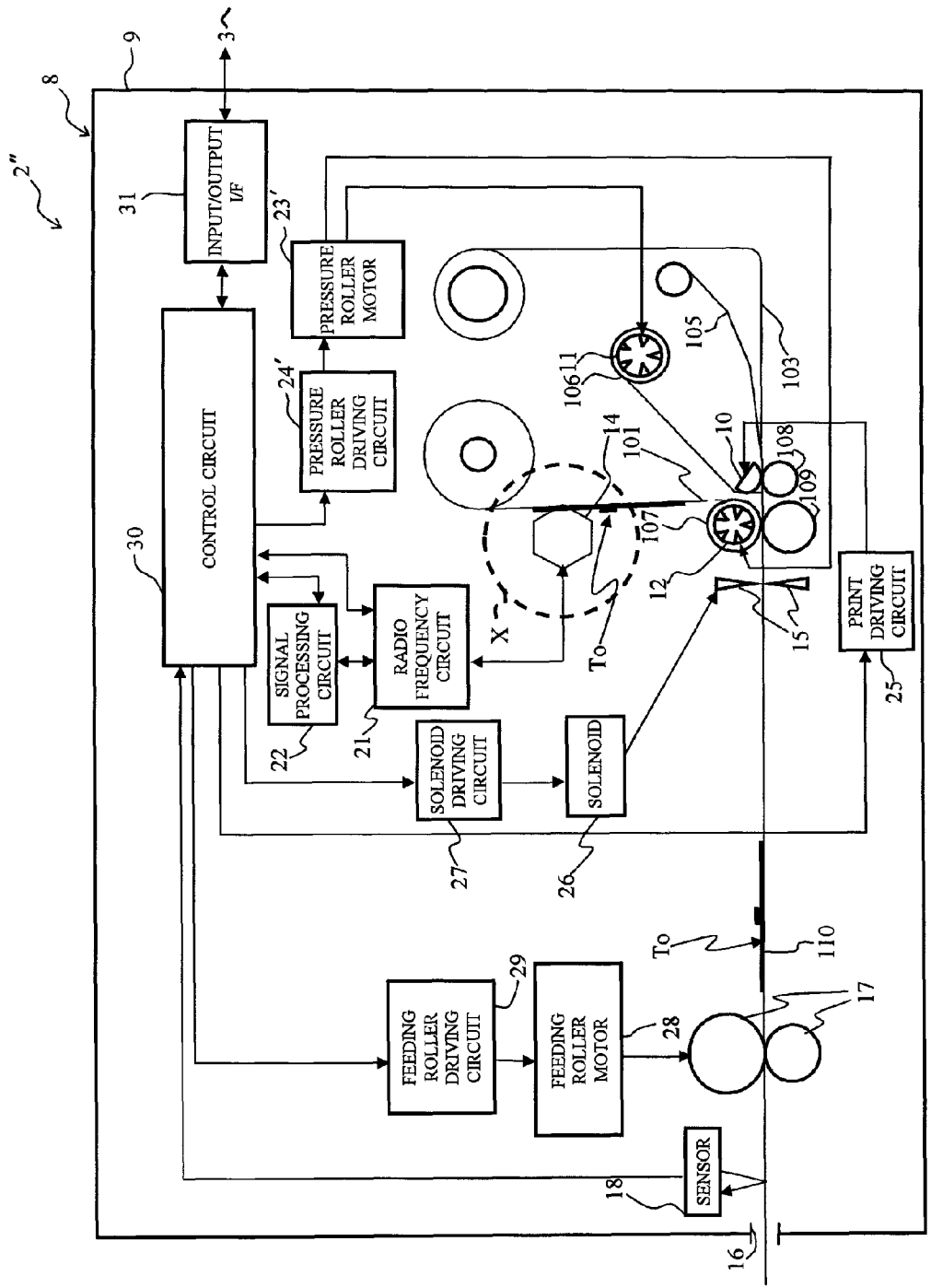
FIG. 14 is a conceptual configuration diagram which shows a detailed configuration of an apparatus for communicating with a RFID tag according to a modification that does not involve any cartridge.

FIG. 14 is a Conceptual Configuration Diagram corresponds to FIG. 2 of the above-described embodiment. FIG. 14 shows a detailed configuration of an apparatus 2" for communicating with a RFID tag according to a modification that does not involve any cartridge. The same components as those shown in FIG. 2 are denoted by the same reference numerals, and description thereof will be omitted suitably. With the modification shown in FIG. 14, the housing 9 including the output opening (discharge opening) 16 is provided to the apparatus main body 8. Furthermore, the same antenna 14 as that in the above-described embodiment is provided to the housing 9.

The antenna 14 comprises a directional antenna (patch antenna) having single-direction directivity. Further, the antenna is disposed near to and alongside the axial direction of the first roll 102 (away from the viewer in FIG. 2) so as to provides a communication area X. The communication area X is positioned near the tape feeding portion where the base tape 101 is fed from the first roll 102. With such an arrangement, the RFID circuit element To discharged to outside the housing 9 through the discharge opening 6 is out of the communication area X provided by the antenna 14. With Such an arrangement, once a RFID circuit element To has been discharged to outside the housing 9 through the discharge opening 16, the RFID tag information stored in the RFID circuit element To is kept from being initialized or from being overwritten by other information transmitted from the antenna 14 in a sure manner. Note that, in order to ensure this function, an suitable shielding member is provided around the discharge opening 16.

With the present modification, the cartridge 100 is eliminated, and the components, which are provided to the cartridge 100 in the above-described embodiment, are directly provided to the housing 9. In connection with such a configuration, the pressure roller driving shaft 12 and the ribbon take-up roller driving shaft 11 are driven by a pressure roller 23'. The pressure roller 23' is controlled and driven by a pressure roller driving circuit 24', instead of the cartridge motor 23 that is controlled and driven by the cartridge driving circuit 24 in the above-described embodiment.

Figure 15:
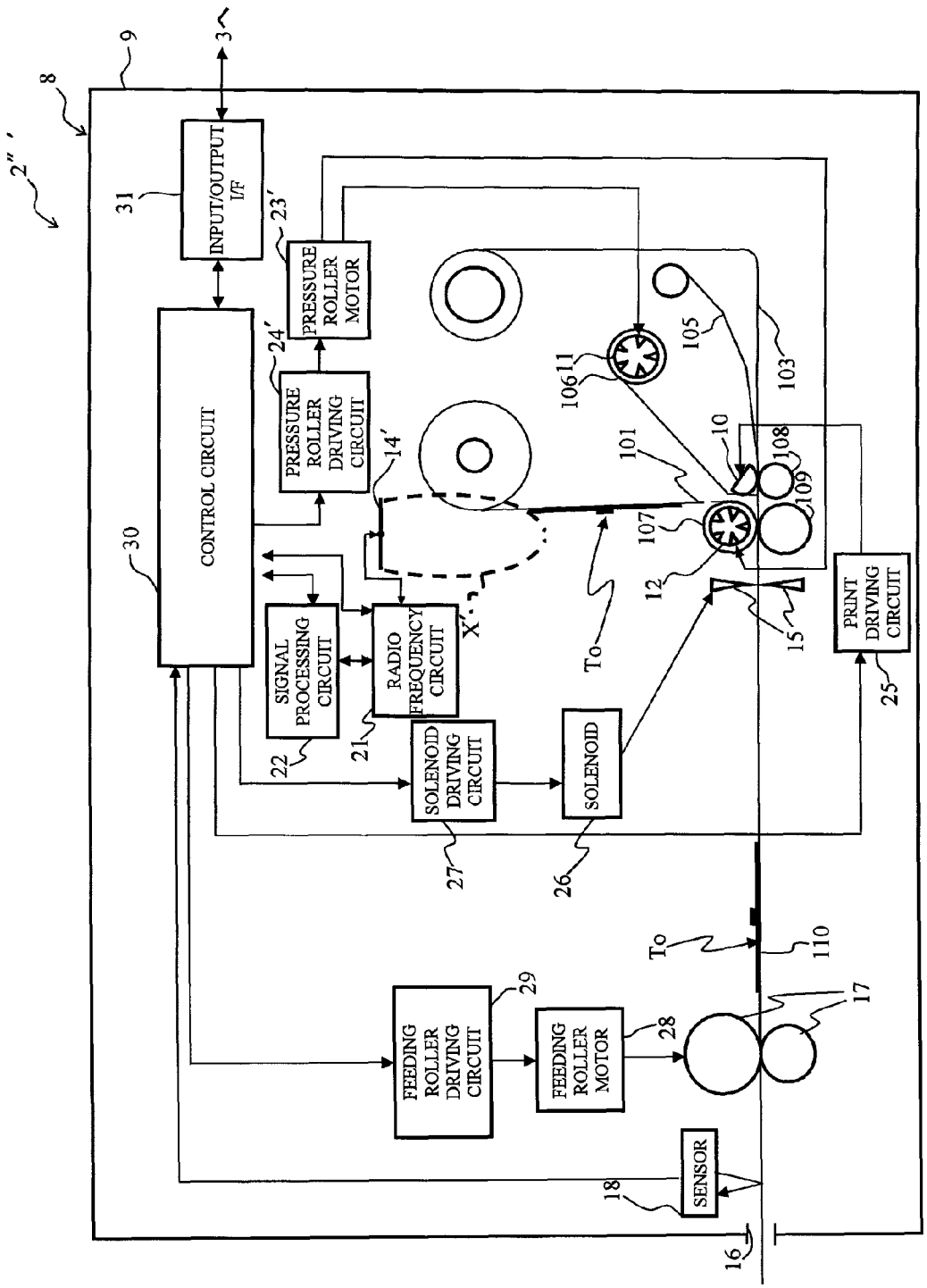
FIG. 15 is a conceptual configuration diagram which shows a detailed configuration of an apparatus for communicating with a RFID tag having a structure in which the antenna is disposed near to and alongside the axial direction of a first roll.

Note that the present invention is not restricted to the present modification described above in which the antenna 14 is disposed near to and alongside the axial direction of the first roll 102. Also, an arrangement may be made in which the antenna 14 is disposed near to and alongside the radial direction of the first roll 102 in the same way as that in the modification described above in (3). FIG. 15 is a conceptual configuration diagram which shows a detailed configuration of an apparatus for communicating with a RFID tag (writing apparatus, tag label creating apparatus) 2''' having such a configuration. The same components as those shown in FIG. 12 are denoted by the same reference numerals, and description thereof will be omitted suitably.

With the writing apparatus 2''' shown in FIG. 15, the antenna 14' provided to the housing 9 comprises a directional antenna (patch antenna) having single-direction directivity (in this example, the downward direction in FIG. 15). The antenna 14' is disposed near to and alongside the radial direction of the first roll 102 (the upward direction in FIG. 15). With that arrangement, the antenna 14' provides a communication area X' positioned near the tape feeding portion where the base tape 101 is fed from the first roll 102.

In the above-described two modifications, the antenna 14 is disposed near to and alongside the axial direction of the first roll 102 (or the antenna 14' is provided near to and alongside the radial direction of the first roll 102). By means of using the antenna 14 (or 14'), writing is also performed for the RFID circuit elements To mounted on the base tape 101 positioned within the communicable area X (or the communication area X'). Both the modifications provide the same advantage as that described in the above-described embodiment. That is to say, these modifications have the advantage of writing the correct RFID tag information to each RFID circuit element To without disposing the first roll 102 and the antenna 14 or 14' at a great distance from each other. Accordingly, the modifications also can offer a small-sized overall system.

(4) Modification without Two Tapes Adhering

In the above-described embodiment, the cover film 103 with print and the tag tape (base tape) 101 including RFID circuit elements To are adhered to each other. Instead of such an arrangement, with regard to the present modification, the present invention is applied to an apparatus for communicating with a RFID tag, using a cartridge for performing printing of the cover film provided to the tag tape.

Figure 16:
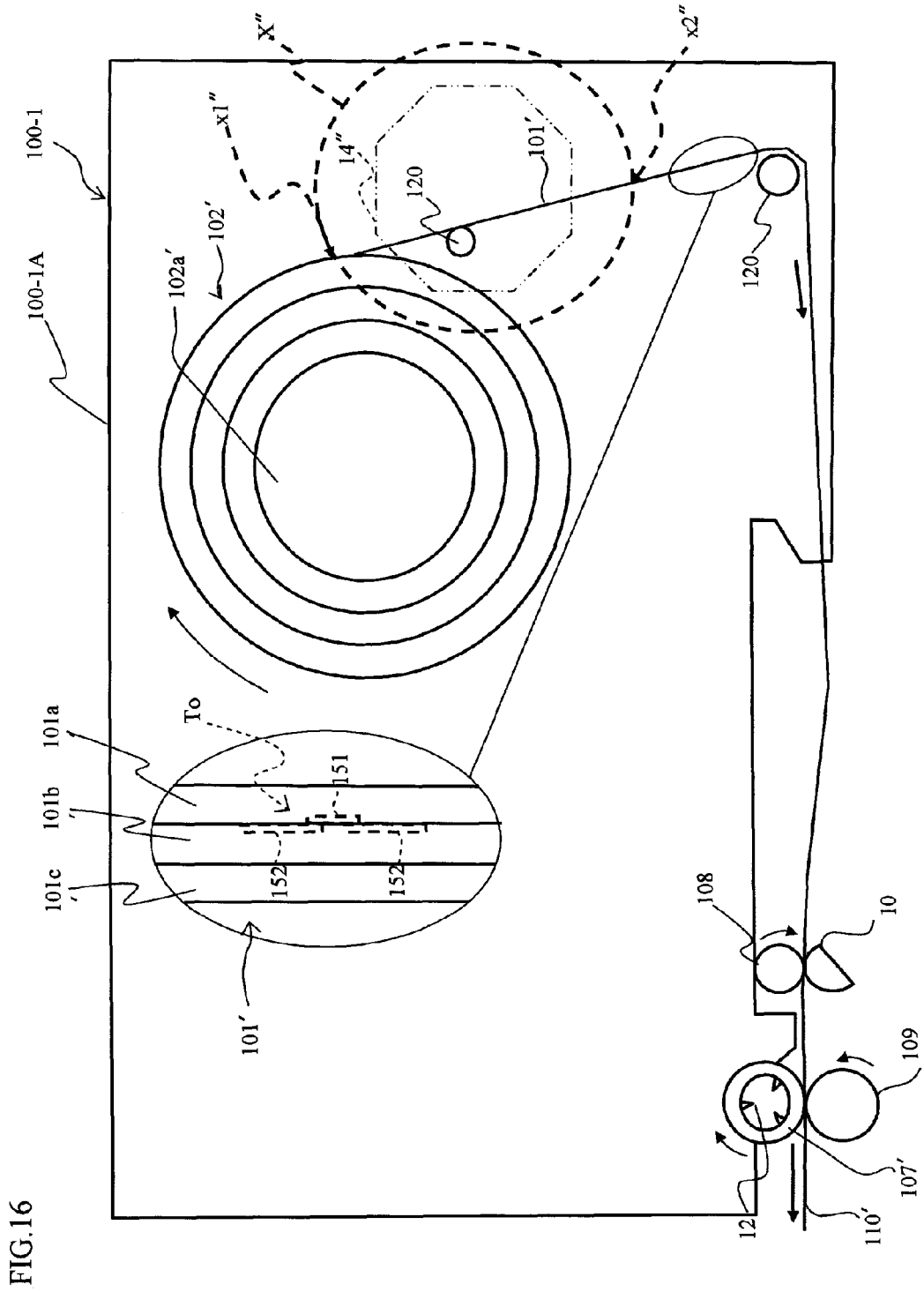
FIG. 16 is an explanatory diagram for describing a detailed configuration of a cartridge according to a modification that does not involve any step for tape adhesion.

FIG. 16 is an explanatory diagram which corresponds to FIG. 3 and so forth for describing the above-described embodiment. FIG. 16 describes a detailed configuration of a cartridge 100-1 according to the present modification. The same components as those shown in FIG. 3 are denoted by the same reference numerals, and description thereof will be omitted suitably.

As shown in FIG. 16, the cartridge 100-1 comprises a first roll (thermo-sensitive tape roll, storage unit) 102' around which a thermo-sensitive tape 101' (tag tape, tag medium) has been wound, and a tape feeding roller 107' configured to transport the thermo-sensitive tape 101' in the direction external to the cartridge 100-1. The first roll 102' and the tape feeding roller 107' are both included within a housing 100-1A.

In the first roll 102', the transparent thermo-sensitive tape 101' is wound around a reel member 102*a*'. A plurality of RFID circuit elements To is serially formed on the thermo-sensitive tape 101' along the longitudinal direction. In this example, thermo-sensitive tape 101' wound around the first roll 102' has a three-layer structure (see partial enlarged view in FIG. 16). The thermo-sensitive tape 101' comprises a cover film 101*a*' formed of PET (polyethylene terephthalate) or the like, an adhesive layer 101*b*' formed of an suitable adhesive material, and a separation sheet 101*c*'. The three layers are layered in that order from the layer that corresponds to the inner side of the rolled tape to the layer that corresponds to the opposite side.

The IC circuit parts 151 configured to store information are provided on the back face of the cover film 101'*a* so as to form a single member. Furthermore, the antenna 152 is provided on the surface of the back side of the cover film 101'*a*. Moreover, the separation sheet 101*c*' is adhered onto the back face of the cover film 101*c*' through the adhesion layer 101*b*'.

Furthermore, the antenna 14" is disposed near to and alongside the axial direction of the first roll 102' (away from the viewer in FIG. 16). The antenna 14" comprises a directional antenna (in this example, a so-called patch antenna is employed) having single-direction directivity (in this example, in the direction of the viewer in FIG. 16). With that arrangement, the antenna 14" provides a communication area X near the tape feeding portion where the base tape 101 is fed from the first roll 102. Note that in the above-described arrangement a part of the first roll 102' is out of the area X". Also, an arrangement can be made in which the entire area of the first roll 102' is included within the area X".

With the configuration, after mounting the cartridge 100-1 to the cartridge holder portion of the writing apparatus 2, the roll holder (not shown) is shifted from the separate position to the contact position. Then, thermo-sensitive tape 101' is held by the nip between the print head 10 and the platen roller 108, and the thermo-sensitive tape 101' is held by the nip between the tape feeding roller 107' and the sub roller 109. Then, the tape feeding roller 107', the sub roller 109, and the platen roller 108 are synchronously rotationally driven by the driving force provided from the cartridge motor 23 (see FIG. 2 or the like, for example) through the pressure roller driving shaft 12.

Thus, the access to the RFID tag information (writing/readout of information) of RFID element circuit To in the thermo-sensitive tape 101' fed out from the first roll 102' is carrying out via the antenna 14" within the area X" near the first roll 102' as described above. After the access, the thermo-sensitive tape 101' is supplied to the print head 10. Electric power is supplied to a plurality of heater elements included in the print head 10 by the print-head driving circuit 25 (see FIG. 2 or the like). Thus, the print head 10 prints the surface of the cover film 101a' of the thermo-sensitive tape 101'. The tag label tape 110 with print' thus formed is transported to outside the cartridge 100-1. Note that it is needless to say that an ink ribbon may be employed in the same way as in the above-described embodiment.

The following steps after the tag label tape 110 with print' has been discharged to outside the cartridge 100-1 (such as the transport step by the feeding roller 17, the cutting step by the cutter 15, etc.) are the same as those in the above-described embodiment. Accordingly, a detail description of the steps will be omitted.

Figure 17:
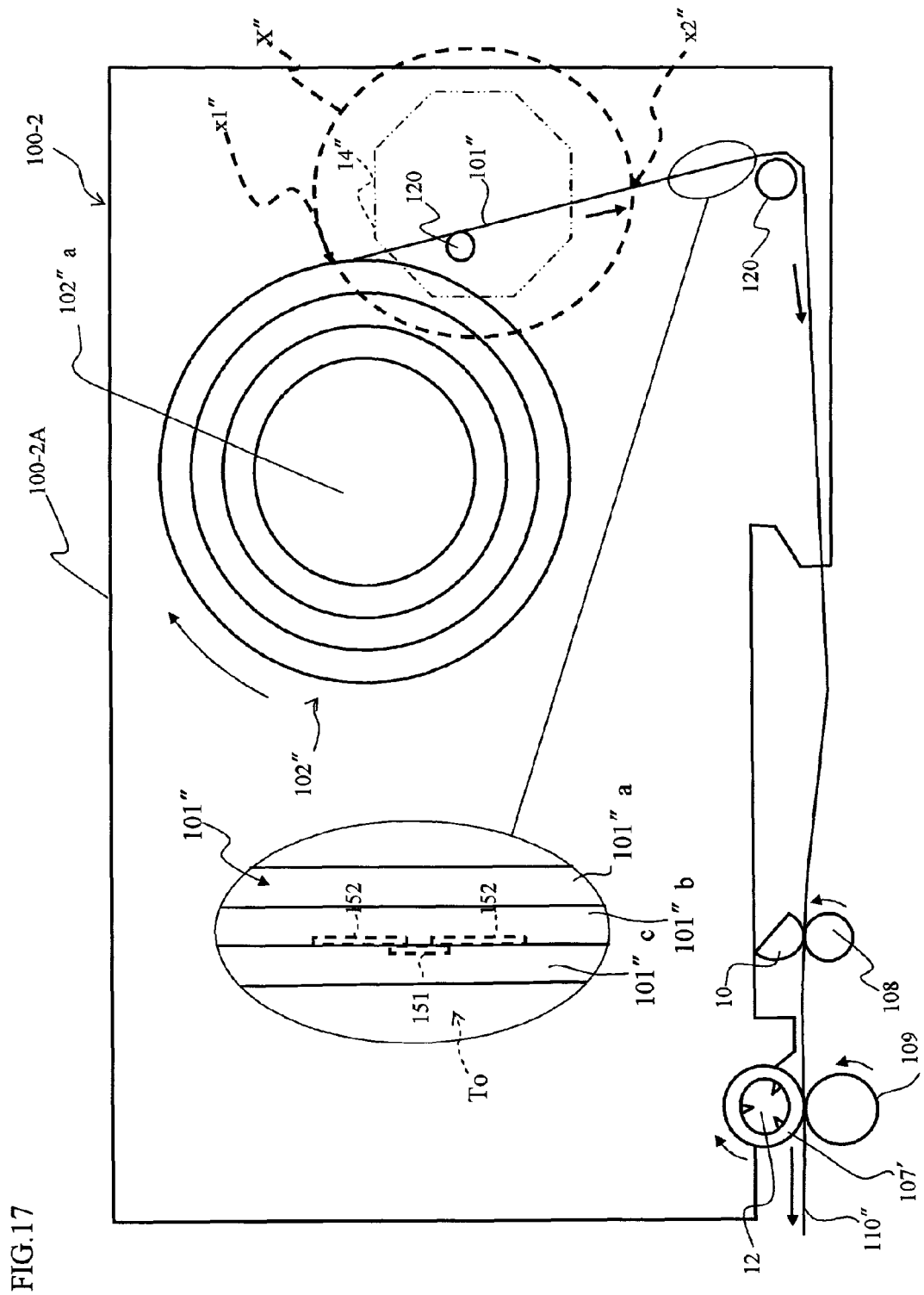
FIG. 17 is an explanatory diagram for describing a detailed configuration of a cartridge according to a modification by pressing a print head into contact with the side of a cover film that faces the cartridge.

Note that printing is performed by pressing the print head 10 into contact with the side of the cover film 101'a that faces away from the cartridge, in the above-described arrangement. The present invention is not restricted to such an arrangement. Also, an arrangement can be made that printing is performed by pressing the print head 10 into contact with the side of the cover film 101'a that faces the cartridge, in the same way as with the above-described embodiment (note that printed characters are not formed in reverse as in a mirror-image). FIG. 17 is an explanatory diagram for describing a detailed configuration of a cartridge 100-2 according to such a modification. FIG. 17 corresponds to FIG. 16 described above. The same components as those shown in FIG. 16 and so forth are denoted by the same reference numerals, and description will be omitted suitably.

In FIG. 17, the cartridge 100-2 includes a first roll (tag tape roll, storage unit) 102", the tape feeding roller 107', and the feeding turning roller 120 (guide roller, guide unit). The thermo-sensitive tape 101" (tag tape, tag medium) is wound around the first roll (tag tape roll, storage unit) 102". The tape feeding roller 107' feeds thermo-sensitive tape 101" to outside the cartridge 100-2. The feeding turning roller 120 greatly turns the feeding direction of thermo-sensitive tape 101".

In the first roll 102", the transparent thermo-sensitive tape 101" is wound around the reel member 102"a. A plurality of RFID circuit elements To is formed on the transparent thermo-sensitive tape 101" along the longitudinal direction.

In this example, the thermo-sensitive tape 101" wound around the first roll 102" has a three-layer structure (see partial enlarged view in FIG. 17). The thermo-sensitive tape 101" comprises a separation sheet 101"a, an adhesive layer 101"b formed of an suitable adhesive material, and a cover film 101"c formed of PET (polyethylene terephthalate) or the like. The three layers are layered in that order from the layer that corresponds to the outer side of the rolled tape (the right side in FIG. 17) to the layer that corresponds to the opposite side (the left side in FIG. 17).

The IC circuit parts 151 are provided on the back face of the cover film 101'c (the right side in FIG. 17) so as to form a single member. Furthermore, the antenna 152 configured to transmit/receive information is provided so as to connect with each IC circuit part 151. The antenna 152 and the IC circuit part 151 forms RFID circuit element To.

The separation sheet 101"a is adhered to the back side of the cover film 101"c (the right side in FIG. 17) through the adhesive layer 101"b so as to include the RFID circuit elements To. Note that, when the user adheres the RFID label T as a label-shaped finished product to an inventory item or the like, the user peels off the separation sheet 101"a. The RFID label T is be able to be adhered to the inventory item by the adhesive layer 101"b.

On the other hand, the antenna 14" comprises a directional antenna (in this example, a so-called patch antenna) having single-direction directivity (in this example, the viewer side of FIG. 17). The antenna 14" is disposed near to and alongside the axial direction of the first roll 102" (away from the viewer in FIG. 17). With that arrangement, the antenna 14" provides a communication area X". The communication area X" is provided near the tape feeding portion where the thermo-sensitive tape 101" is fed from the first roll 102". Note that in the above-described arrangement a part of the first roll 102" is out of the area X". Also, an arrangement can be made that the entire area of the first roll 102" is included within the area X".

After mounting the cartridge 100-2 to the cartridge holder portion of the writing apparatus 2, the roll holder (not shown) is shifted from the separate position to the contact position. Thus, the thermo-sensitive tape 101" is held by the nip between the print head 10 and the platen roller 108, and further held by the nip between the tape feeding roller 107' and a sub roller 109. Then, the tape feeding roller 107', the sub roller 109, and the platen roller 108 are synchronously rotationally driven by the driving force provided from the cartridge motor 23 (see FIG. 2 or the like) through the tape feeding roller driving shaft 12. As a result, the thermo-sensitive tape 101" is fed out from the first roll 102". The direction of the thermo-sensitive tape 101" thus fed out is greatly turned by the feeding turning roll 120. Then, the thermo-sensitive tape 101" is supplied to the print head 10. Thus, access (writing/readout of information) to the RFID tag information of the RFID element circuit To in the thermo-sensitive tape 101" fed out from the first roll 102" within the communication area X" is performed via the antenna 14". Then, the thermo-sensitive tape 101" is supplied to the print head 10.

Electric power is supplied to a plurality of heater elements included in the print head 10 by the print-head driving circuit 25 (see FIG. 2 or the like). And therefore the print head 10 carries out printing the surface of the cover film 101"c of thermo-sensitive tape 101". The tag label tape 110 with print" thus formed is transported to outside the cartridge 100-2. Note that it is needless to say that an ink ribbon may be employed for printing in the same way as in the above-described embodiment.

The following steps after the tag label tape 110 with print" has been transported to outside the cartridge 100-2, such as the transport step by the feeding roller 17, the cutting step by the cutter 15, etc., are the same as those in the above-described embodiment. Thus, a detail description of the steps will be omitted.

Both the modifications provide the same advantage as that described in the above-described embodiment. That is to say, these modifications have the advantage of writing the correct RFID tag information to each RFID circuit element To without disposing the first rolls 102' and 102" and the antenna 14 at a great distance from one another. Accordingly, these modifications can offer a small-sized overall system.

Note that an arrangement may be made employing the same antenna 14' employed in the Modification (2) described above as the antenna 14", instead of the antenna 14 employed in the above-described embodiment.

(5) Modification Using Tag Label without Print

In the above-described embodiment and modifications (1) through (4), printing is performed on the cover film by the print head 10, and therefore the tag label T has a print R thereon. However, the print R is not indispensable to the present invention.

Figure 18:
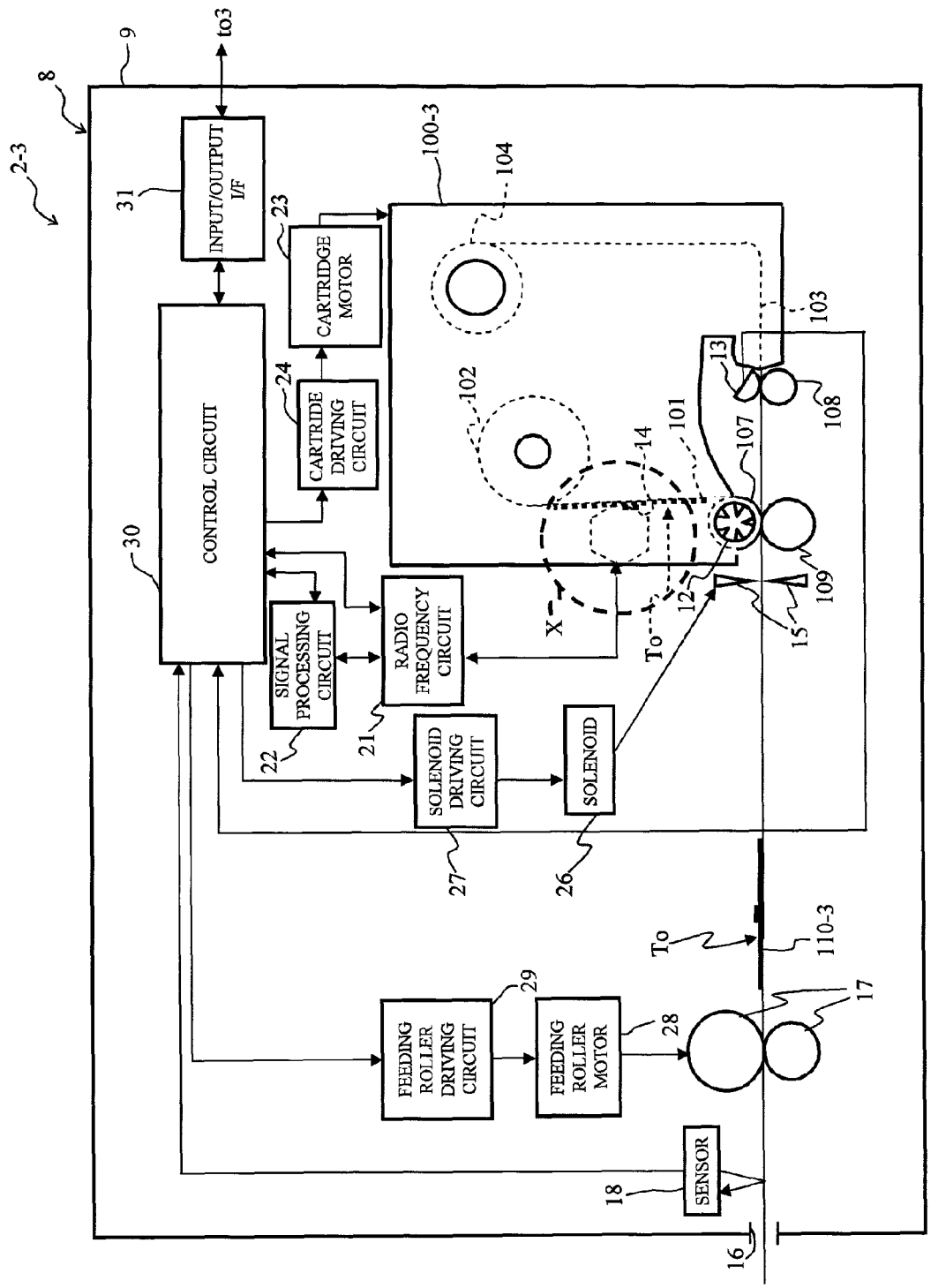
FIG. 18 is a conceptual configuration diagram which shows a detailed configuration of an apparatus for communicating with a RFID tag according to a modification without involving the print head.
Figure 19:
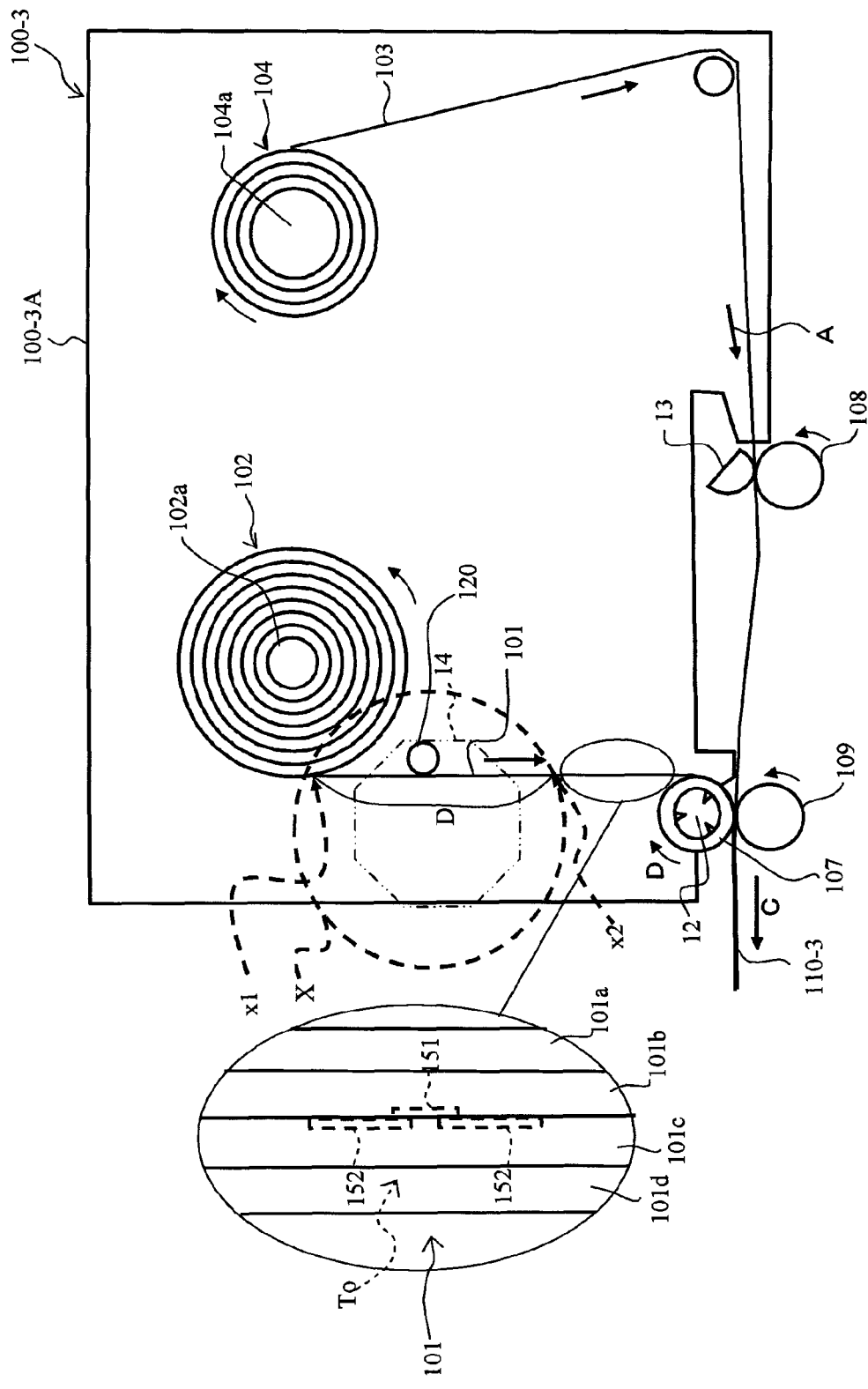
FIG. 19 is an explanatory diagram for describing a detailed configuration of a cartridge shown in FIG. 18.

FIG. 18 is a conceptual configuration diagram which shows a detailed configuration of an apparatus for communicating with a RFID tag 2-3 according to a modification. The apparatus 2-3 does not involve the print head of the above-described embodiment. FIG. 19 is an explanatory diagram for describing a detailed configuration of a cartridge 100-3 shown in FIG. 18. FIGS. 18 and 19 correspond to FIGS. 2 and 3 for describing the above-described embodiment, respectively. The same components as those shown in FIGS. 2 and 3 are denoted by the same reference numerals, and description thereof will be omitted suitably.

With regard to the writing apparatus 2-3 shown in FIGS. 18 and 19, the apparatus main body 8 of the cartridge 100-3 includes a scanner (barcode scanner) 13. The scanner 13 is provided at approximately the same position as that of the print head 10 instead of the print head 10 of the above-described embodiment. The barcode scanner 13 reads out an identifier (not shown) printed on the cover film 103 in the form of a barcode, for example, and outputs a corresponding signal. Examples of the identifiers includes a tag ID (identification information), in the form of a barcode, of a respective RFID circuit element To disposed on the base tape 101. With such an arrangement, the tag ID read out by the scanner 13 is input to the control circuit 30. Then, RFID tag information that corresponds to the tag ID is transmitted via the radio frequency circuit transmitting portion 32 and the antenna 14, and the RFID tag information is written to each of the RFID circuit elements To remaining in the area X.

Note that FIG. 18 shows an arrangement without the printhead driving circuit 25 shown in FIG. 2, which corresponds to the elimination of the print head 10.

Figure 20:
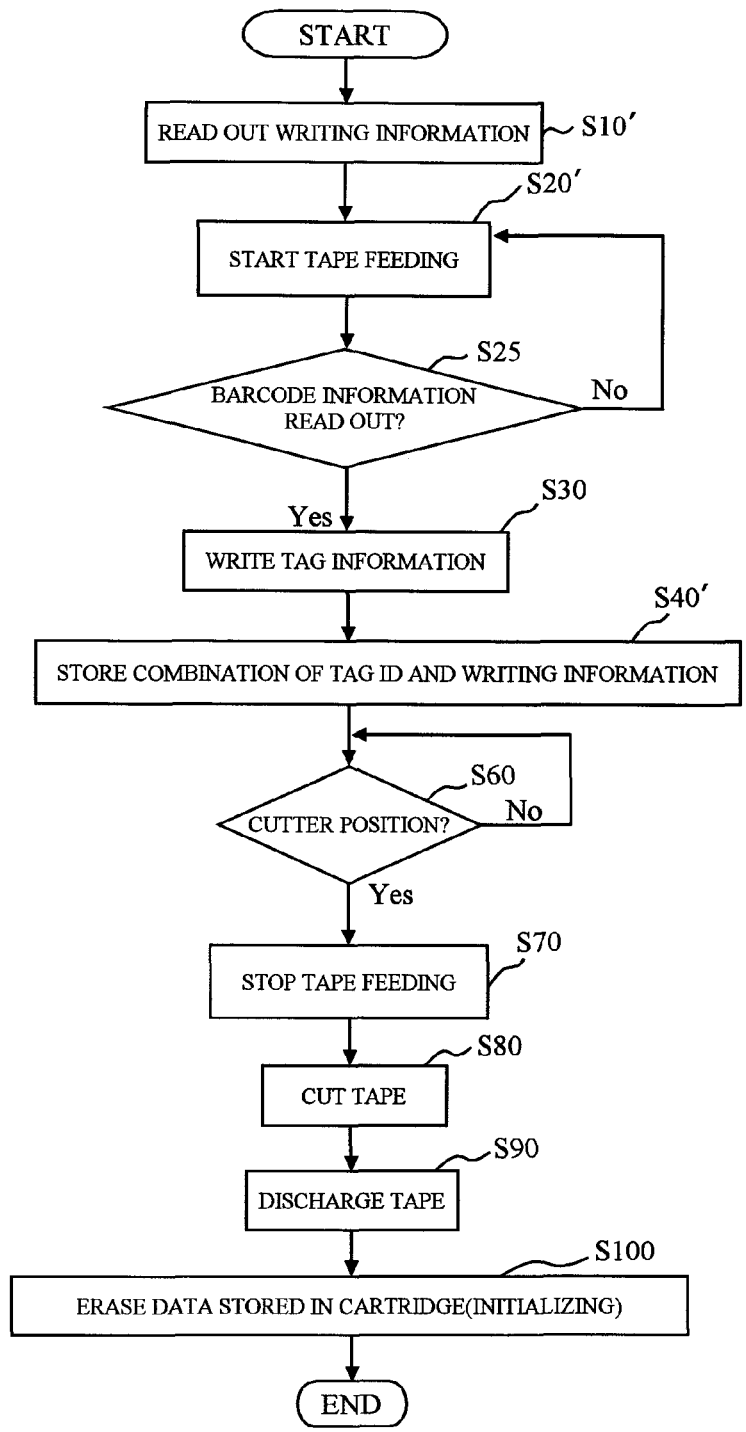
FIG. 20 is a flowchart which shows a control procedure executed by the control circuit.

FIG. 20 is a flowchart which shows a control procedure executed by the control circuit 30 according to the present modification. FIG. 20 approximately corresponds to FIG. 9 for describing the above-described embodiment. The same components as those shown in FIG. 9 are denoted by the same reference numerals, and description thereof will be omitted suitably.

As shown in FIG. 20, upon performance of the writing operation by the writing apparatus 2-3, this flow starts. Step S10' is provided instead of Step S10 shown in FIG. 9. First, in Step S10', the RFID tag information to be written to the IC circuit part 151 of the RFID circuit element To is read out via the communication circuit 3 and the input/output interface 31.

Step S20' is provided instead of Step S20 shown in FIG. 9. Subsequently, in Step S20', a control signal is output to the cartridge driving circuit 24 so as to rotationally drive the ribbon take-up roller 106 and the pressure roller 107 by the driving force provided from the cartridge motor 23. As a result, the base tape 101 is fed out from the first roll 102, and is supplied to the pressure roller 107. At the same time, the cover film 103 is fed out from the second roll 104. Furthermore, at this time, a control signal is output to the feeding roller motor 28 via the feeding roller driving circuit 29 so as to rotationally drive the feeding roller 17. As a result, the driving of the tapes 101, 103, and 110 is started such that the base tape 101 and the cover film 103 are adhered to each other. Thus, a tag label tape 110-3 (without printed characters) is formed in the form of a single member, as described above. The tag label tape 110-3 thus formed is transported to outside the cartridge 100-3.

Subsequently, the flow proceeds to Step S25, which is a new step. In Step S25, decision is made that the scanner 13 has succeeded in reading out the barcode information (tag ID). The barcode information has been provided onto the cover film 103 that corresponds to the RFID circuit element To mounted on the base tape 101.

In a case that the decision condition has been satisfied, i.e., in a case of readout success, the flow proceeds to Step S30 in the same way as in FIG. 9. In Step S30, the RFID tag information that corresponds to the tag ID read out in the Step S25 is transmitted and written to the RFID circuit element To.

Upon completion of Step S30, the flow proceeds to Step S40'. Step S40' is a new step provided corresponding to Step S40 shown in FIG. 9. In Step S40', the combination of the barcode information (the proper readout of which has been confirmed in the Step S25) and the RFID tag information written to the RFID circuit element To are output via the input/output interface 31 and the communication line 3, by using the terminal 5 or the general purpose computer 6. Thus, the combination of these information sets is stored in the information server 7 or the route server 4. Note that the storage data is stored in a database in a form that allows the terminal 5 or the general purpose computer 6 to refer to the storage data as necessary.

Upon completion of Step S40', the flow proceeds to Step S60 in the same way as in FIG. 9. The steps following the Step S60 are the same as those in FIG. 9 for describing the embodiment, and accordingly, description thereof will be omitted.

The present modification also provides the same advantage as that described in the above-described embodiment. That is to say, the present modification has the advantage of writing the correct RFID tag information to each RFID circuit element To without disposing the first roll 102 and the antenna 14 in the cartridge 100-3 at a great distance from each other. Thus, the present modification can offer a small-size overall system.

(6) Other

In the embodiment and modifications (1) through (5), the antenna 14 is disposed so as to provide the areas X, X', X", or the like. The present invention is not restricted to such an arrangement. It is sufficient to provide an arrangement having a communication area of the antenna 14 or the like. In the arrangement, the RFID element circuit To on the base tape 101 or the like from the first roll 102 or the like passes through the communication area before reaching a non-communication area where the radio waves cannot be received from the antenna 14 or the like in the final stage.

Figure 21:
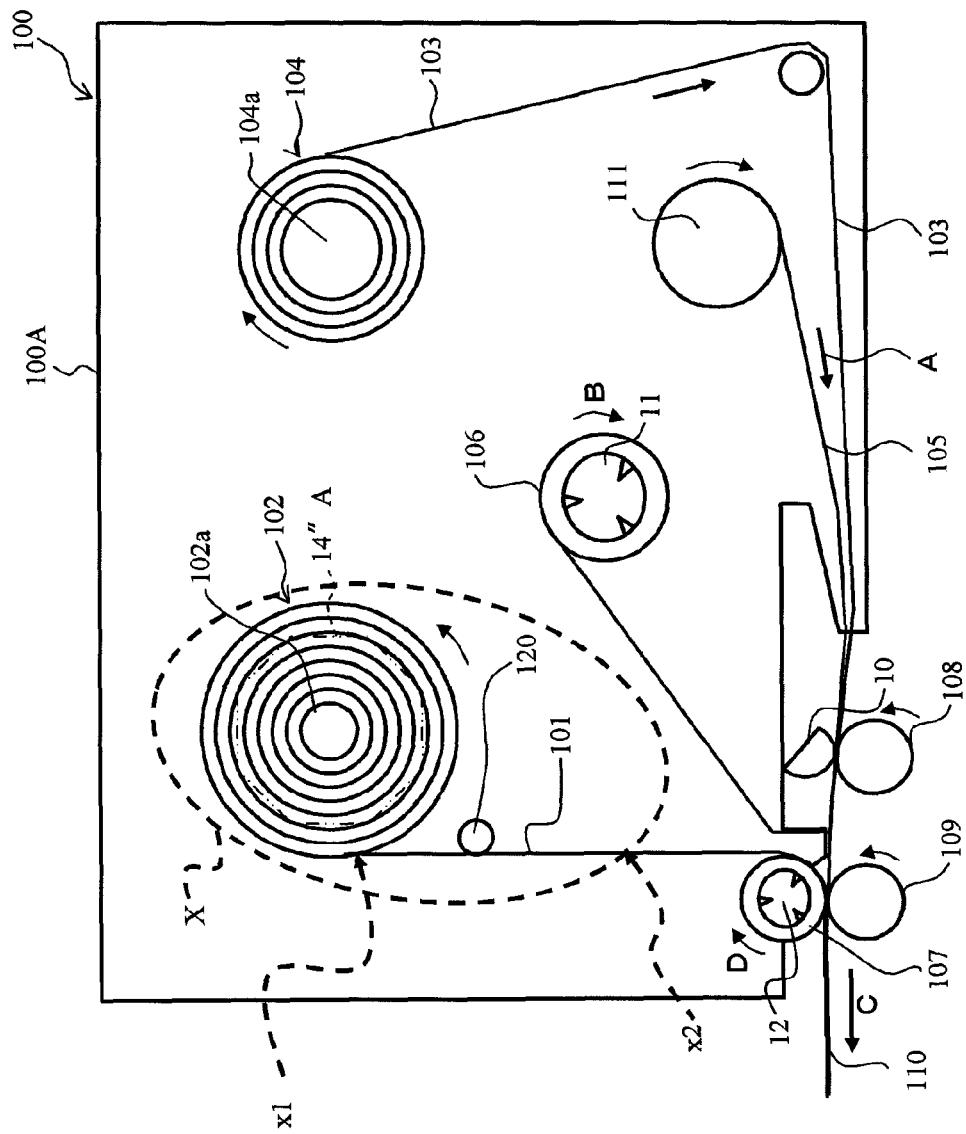
FIG. 21 is an explanatory diagram for describing a detailed configuration of a cartridge according to a modification of the antenna arrangement of the apparatus for communicating with a RFID tag shown in FIG. 3.

In the example in the above-described embodiment shown in FIG. 3, an arrangement is possible as follows. That is, the antenna 14 or the like is disposed so as to provide a communication area which spreads from at least the position x1 (corresponds to the portion immediately after the base tape 101 is fed out) to the position x2. The distance from the position x1 to the position x2 along the feeding direction equals to the initial diameter D of the first roll 102 (or the overall length of the RFID label T may be employed). For example, an arrangement shown in FIG. 21 is also available. In the arrangement of FIG. 21, antenna 14A is provided at substantially same position as the first roll 102 in a manner having a substantially common axis. With the arrangement, the directivity of the antenna 14A is controlled by a suitable manner, and therefore a communication area X of the antenna 14A is made by the control. Thus, the communication area X spreads from at least the position x1 to the position x2 as described above. With such arrangements described above, once a RFID circuit element To is discharged to outside the housing 100A through a discharge opening (not shown), the RFID circuit element To is out of the communication area provided by the antenna 14. The discharge opening is provided to the housing 100A of the cartridge 100 near the pressure roller 107. With such an arrangement, suitable shielding member is provided around the discharge opening 100Aa (not shown) of the housing 100A. It is ensured that once a RFID element circuit To has been discharged to outside through the discharge opening 100Aa, the RFID tag information stored in the RFID circuit element To is kept from being initialized or from being replaced by other information from the antenna 14.

Figure 22:
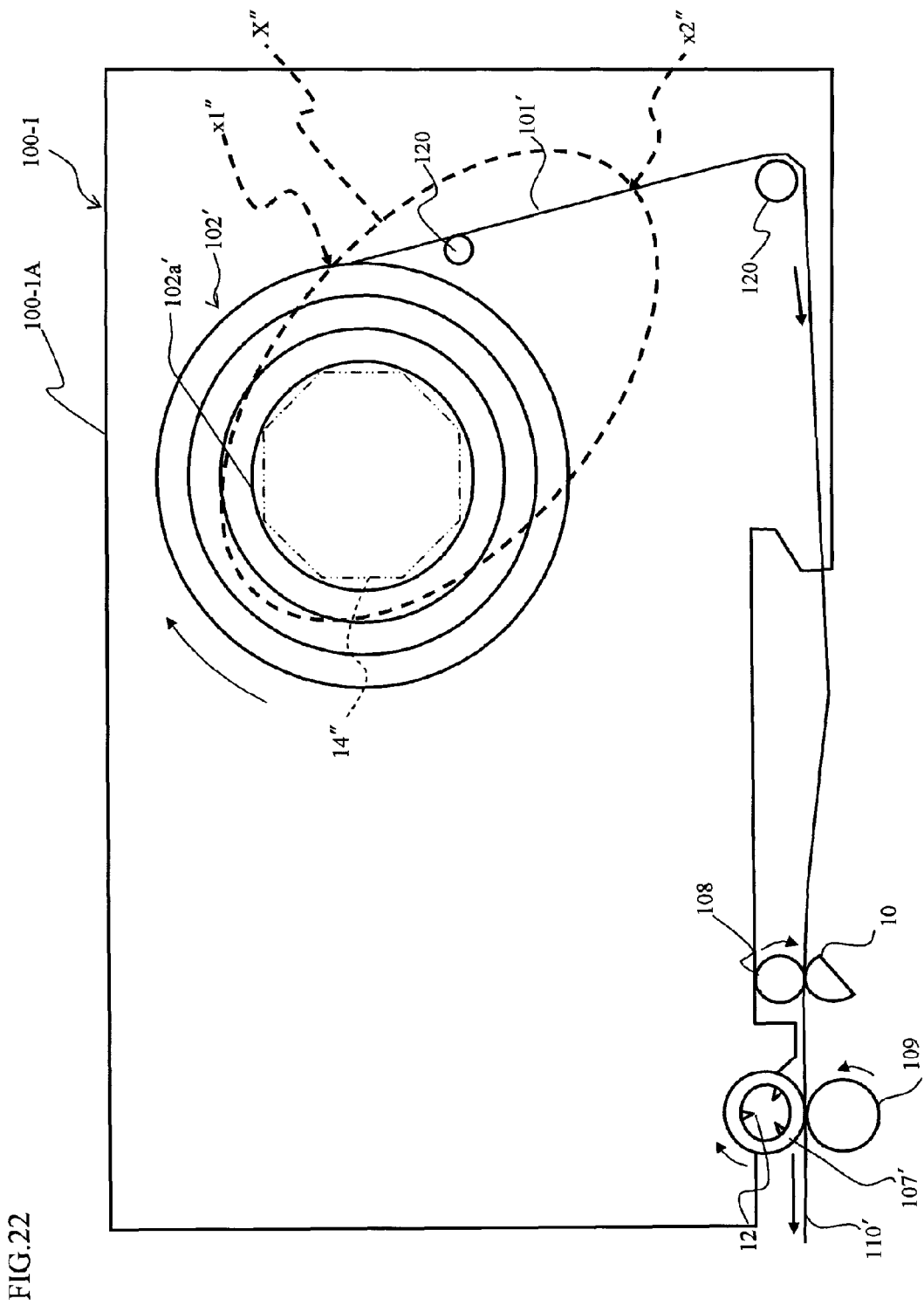
FIG. 22 is an explanatory diagram for describing a detailed configuration of a cartridge according to a modification of the antenna arrangement of the apparatus for communicating with a RFID tag shown in FIG. 16.

On the other hand, in the example shown in FIG. 16, another arrangement is possible as follows. That is, the antenna 14" or the like is disposed so as to provide a communication area which spreads from at least the position x1" (corresponds to the portion immediately after the thermo-sensitive tape 1011 is fed out) to the position x2". The distance from the position x1" to the position x2" along the feeding direction equals to the initial diameter D of the first roll 102' (or the overall length of the RFID label T may be employed). For example, an arrangement shown in FIG. 22 is also available. In the arrangement of FIG. 22, antenna 14"A is provided at substantially same position as the first roll 102' in a manner having a substantially common axis. With the arrangement, the directivity of the antenna 14"A is controlled by a suitable manner, and therefore a communication area X" of the antenna 14"A is made by the control. Thus, the communication area X" spreads from at least the position x1" to the position x2" as described above. With such arrangements described above, once a RFID element To is discharged to outside the housing 100-1A through a discharge opening (not shown), the RFID circuit element To is out of the communication area provided by the antenna 14". The discharge opening is provided to the housing 100-1A of the cartridge 100-1 near the feeding roller 107'. With such an arrangement, suitable shielding member is provided around the discharge opening 100-1Aa (not shown) of the housing 100-1A. It is ensured that once a RFID element circuit To has been discharged to outside through the discharge opening 100-1Aa, the RFID tag information stored in the RFID circuit element To is kept from being initialized or from being replaced by other information from the antenna 14".

Such an arrangement that the antenna 14, 14', 14", or the like is disposed at such a position as described above offers the same advantage as the above-described embodiment. Namely, in the arrangements, the correct RFID tag information is written to each RFID circuit element To without disposing the first roll 102 or the like and the antenna 14 or the like at a great distance from each other. Hence, the arrangements offers a small-size overall system, which is the essential advantage of the present invention.

In the above-described description except for the modification (5), printing is started after the writing of the RFID tag information to the RFID circuit element To is started. The present invention is not restricted to such an arrangement. Also, an arrangement can be made that writing is started after the start of printing, which is the converse of the procedure. Such an arrangement also provides the same advantage.

Further, in the above-described description, writing is performed for the base tape 101 (or thermo-sensitive tape 101') moving within the cartridge 100 or the like while the printing operation is being performed. The present invention is not restricted to such an arrangement. Also, an arrangement can be made that the base tape 101 or the like is stopped before writing at a predetermined position (furthermore, where the base tape 101 or the like is held by a predetermined feeding guide), and writing is performed for the base tape 101 or the like when it is stationary.

More further, in the above-described description, the base tape 101 or thermo-sensitive tape 101' or 101" as a tag tape is wound around the reel member 102'a or 102"a so as to form the roll 102, 102' or 102". The roll 102, 102', or 102" is disposed within the cartridge 100, 100', 100-1, or 100-2, and hence the tape 101, 101' or 101" is fed from the cartridge. The present invention is not restricted to such an arrangement. For example, an arrangement can be made as follows. Namely, a tag medium including at least one RFID circuit element To is stacked on a predetermined storage portion so as to form a cartridge. The tag medium is formed in the form of long strips or rectangular sheets (including a tape cut to a suitable length after being supplied from a roll of tape). Thus, the cartridge is mounted to the cartridge holder provided to the writing apparatus 2. Then, the tape or sheet is supplied or fed, and printing or writing is performed for the tape or the sheet, thereby forming tag labels. With such an arrangement, the antenna according to the present invention is provided to a suitable position of the writing apparatus. Namely, a communication area of the antenna arranged at the suitable position can be provided near the feeding start position where the tape or the sheet is fed from the storage portion.

The present invention is not restricted to such an arrangement using a cartridge or the like. Also, an arrangement can be made that the cartridge is eliminated as shown in FIGS. 14 and 15 described above. For example, an arrangement is conceivable that a long-length or rectangular tape or sheet is fed into the writing apparatus 2 from a storage portion by means of a predetermined feeding mechanism (feeder mechanism) sheet by sheet. The storage portion is arranged external to the writing apparatus 2. Also with such an arrangement, the device antenna can be disposed such that communication area can be made near the feeding start position where the tape or sheet is fed into the writing apparatus 2 in the same way as in the above-described embodiment.

Note that the "Erase" signal, the "Verify" signal, and the "Program" signal are based on the method created by EPC global. Here, EPC global is a nonprofit corporation co-established by EAN (European Article Number) International, which is an international distribution code organization, and the Uniform Code Council (UCC), which is an American distribution code organization. Note that any signals based on the other standards can be employed as long as the signals provide the same functions.

Note that various modifications which are not described in particular can be made according to the present invention without departing from the spirit and scope of the invention.

What is claimed is:

1. An apparatus for communicating with an RFID tag comprising:
    an information creating unit configured to create RFID tag information which is to be written to an IC circuit part of an RFID circuit element that transmits/receives information, said RFID circuit element comprises said IC circuit part for updatably storing information and a tag antenna connected to said IC circuit part;
    a feeding unit configured to feed a tag tape on which said RFID circuit elements have been mounted, from a tag tape roll, in which said tag tape is wound, along a predetermined transport path;
    a guide unit configured to guide said tag tape fed out from said tag tape roll such that said transport path thereof is restricted to within a predetermined range with respect to said device antenna; and
    a device antenna configured to transmit said RFID tag information created by said information creating unit to said tag antenna by radio communication and write said RFID tag information to said IC circuit part, disposed to provide a communication area near said tag tape roll on said transport path; and an initializing command creating unit configured to create an initializing command signal that initializes said RFID tag information written to said IC circuit part, wherein said device antenna transmits said initializing command signal created by said initializing command creating unit to said tag antenna, and initializing said RFID tag information stored in said IC circuit part, wherein said guide unit is disposed within said communication area of said antenna.

2. The apparatus for communicating with an RFID tag according to claim 1, wherein said device antenna is disposed so as to provide at least a communication area near a fed out portion of said tag tape roll configured to feed said tag tape.

3. The apparatus for communicating with an RFID tag according to claim 1, wherein:

said apparatus for communicating with an RFID tag further comprises a controller configured to control said information creating unit, said feeding unit, and said initializing command creating unit so as to execute:

a first step in which said information creating unit creates and writes said RFID tag information;

a second step in which said feeding unit has fed said tag tape in the feeding out direction; and a third step in which said initializing command creating unit creates said initializing command signal after said first step and said second step.

4. The apparatus for communicating with an RFID tag according to claim 2, wherein said device antenna is arranged so as to provide a communication area that does not permit communication via said device antenna with said RFID circuit element which has been discharged to outside a housing that stores said tag tape roll, through a discharge opening.

5. The apparatus for communicating with an RFID tag according to claim 4, further comprising a cartridge holder configured to detachably mount a cartridge that includes said housing within which is included said tag tape roll.

6. The apparatus for communicating with an RFID tag according to claim 5, wherein said device antenna is provided outside of said cartridge and communicates by radio communication with said RFID circuit element mounted on said tag tape stored in said tag tape roll within said cartridge.

7. The apparatus for communicating with an RFID tag according to claim 5, wherein said cartridge includes said guide unit.

8. The apparatus for communicating with an RFID tag according to claim 4, wherein said housing is a body-housing of a main body of said apparatus for communicating with an RFID tag, and said device antenna is provided to said body-housing.

9. The apparatus for communicating with an RFID tag according to claim 2, wherein said device antenna is disposed near said tag tape roll in the axial direction thereof.

10. The apparatus for communicating with an RFID tag according to claim 2, wherein said device antenna is disposed near said tag tape roll in the radial direction thereof.

11. The apparatus for communicating with an RFID tag according to claim 2, wherein said device antenna is a patch antenna having single-direction directivity.

12. The apparatus for communicating with an RFID tag according to claim 2, further comprising:

a printing unit configured to carry out desired printing for a print receiving tape fed out from a print receiving tape roll formed by said print receiving tape; and a bonding unit configured to adhere said print receiving tape printed by said printing unit and said tag tape to each other.

13. An apparatus for producing RFID labels comprising:

an information creating unit configured to create RFID tag information which is to be written to an IC circuit part of an RFID circuit element that transmits/receives information, said RFID circuit element comprising said IC circuit part for updatably storing information and a tag antenna connected to said IC circuit part;

a cartridge holder configured to mount a cartridge that includes said tag tape roll configured to rotate, said tag tape roll storing a tag tape having a plurality of said RFID circuit elements so that the tag tape is separated from an outer periphery of said tag tape roll and supplied;

a feeding unit configured to feed said plurality of RFID circuit elements sequentially disposed on said tag tape fed out from said tag tape roll of said cartridge mounted in said cartridge holder along a predetermined transport path;

a patch antenna that is arranged so that a direction of an antenna face of said patch antenna is substantially orthogonal to a direction of tape face of said tag tape positioned at said transport path and that has a directivity towards a side of said tag tape positioned at said transport path;

a power setting portion configured to set a power of said patch antenna so that at least an area near a separated portion of said tag tape in said tag tape roll is within a communication area of said patch antenna and another area downstream from said area near said separated portion along said feeding path is not within said communication area of said patch antenna;

a writing processing portion configured to transmit said RFID tag information created by said information creating unit via said patch antenna by radio communication and write common RFID tag information repeatedly to said IC circuit part of said plurality of said RFID circuit elements fed by said feeding unit while said plurality of RFID circuit elements are staying within said communication area of said patch antenna set by said power setting portion;

a delete command creating unit configured to create a delete command signal that initializes information in said IC circuit part;

a delete process portion configured to delete information in said IC circuit part of said plurality of RFID circuit elements repeatedly by means of transmitting said delete command signal created by said delete command creating unit via said patch antenna by radio communication while said plurality of RFID circuit elements fed by said feeding unit are staying within said communication area of said patch antenna set by said power setting portion; and a cutter configured to cut one part of said tag tape and produce an RFID label, said part including said RFID circuit element, said RFID circuit element exiting from said communication area of said patch antenna set by said power setting portion in accordance with a feeding of said feeding unit and having said IC circuit part storing information outside of a radio communication range of said delete command signal.

14. The apparatus for communicating with an RFID tag according to claim 13, wherein said guide unit is provided within a communication range of said patch antenna.

* * * * *